(12) United States Patent
Sato et al.

(10) Patent No.: US 10,474,387 B2
(45) Date of Patent: Nov. 12, 2019

(54) MUSICAL SOUND GENERATION DEVICE, MUSICAL SOUND GENERATION METHOD, STORAGE MEDIUM, AND ELECTRONIC MUSICAL INSTRUMENT

(71) Applicant: CASIO COMPUTER CO., LTD., Tokyo (JP)

(72) Inventors: Hiroki Sato, Tokyo (JP); Hajime Kawashima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/046,861

(22) Filed: Jul. 26, 2018

(65) Prior Publication Data

US 2019/0034115 A1    Jan. 31, 2019

(30) Foreign Application Priority Data

Jul. 28, 2017    (JP) .................................. 2017-146126

(51) Int. Cl.
| | |
|---|---|
| G06F 12/00 | (2006.01) |
| G06F 3/06 | (2006.01) |
| G10H 7/00 | (2006.01) |
| G10H 1/24 | (2006.01) |
| G10H 7/04 | (2006.01) |

(52) U.S. Cl.
CPC .......... *G06F 3/0647* (2013.01); *G06F 3/0604* (2013.01); *G06F 3/0611* (2013.01); *G06F 3/0631* (2013.01); *G06F 3/0656* (2013.01); *G06F 3/0673* (2013.01); *G10H 1/24* (2013.01); *G10H 7/002* (2013.01); *G10H 7/045* (2013.01); *G10H 2230/031* (2013.01); *G10H 2240/005* (2013.01); *G10H 2240/161* (2013.01)

(58) Field of Classification Search
CPC .... G06F 3/0647; G06F 3/0604; G06F 3/0611; G06F 3/0673; G10H 7/002; G10H 1/24; G10H 7/045; G10H 2230/031
See application file for complete search history.

(56) References Cited

U.S. PATENT DOCUMENTS

| | | |
|---|---|---|
| 5,522,010 A | 5/1996 | Toyama |
| 5,670,728 A | 9/1997 | Ogai et al. |

(Continued)

FOREIGN PATENT DOCUMENTS

| | | |
|---|---|---|
| JP | H09-26791 A | 1/1997 |
| JP | 2000-122668 A | 4/2000 |

(Continued)

OTHER PUBLICATIONS

U.S. Appl. No. 16/129,575, filed Sep. 12, 2018.

*Primary Examiner* — Arvind Talukdar
(74) *Attorney, Agent, or Firm* — Chen Yoshimura LLP

(57) ABSTRACT

When transferring waveform data from a waveform region in a high-capacity flash memory to a waveform buffer in a RAM, first, whether a non-ring buffer region that can receive the waveform data can be allocated in the RAM is determined, and if so, the waveform data is transferred to the allocated non-ring buffer region. If such a non-ring buffer region cannot be allocated, then whether a ring buffer region that can receive the waveform data can be allocated in the RAM is determined, and if so, the waveform data is transferred to the ring-buffer region in a ring buffer operational manner.

6 Claims, 21 Drawing Sheets

(56) References Cited

U.S. PATENT DOCUMENTS

| | | |
|---|---|---|
| 5,714,704 A | 2/1998 | Suzuki et al. |
| 5,717,818 A | 2/1998 | Nejime et al. |
| 5,869,781 A | 2/1999 | Kurata |
| 5,974,015 A | 10/1999 | Iizuka et al. |
| 6,835,885 B1 | 12/2004 | Kondo et al. |
| 6,982,904 B2 | 1/2006 | Shiga |
| 7,105,735 B2 | 9/2006 | Senoo et al. |
| 7,259,314 B2 | 8/2007 | Kobayashi et al. |
| 7,381,879 B2 | 6/2008 | Tamura |
| 8,837,752 B2 | 9/2014 | Fujita et al. |
| 9,705,620 B2 | 7/2017 | Clovis et al. |
| 10,057,047 B2 | 8/2018 | Bogdan |
| 10,083,682 B2 | 9/2018 | Kojima |
| 2001/0013270 A1 | 8/2001 | Kumamoto et al. |
| 2004/0181655 A1 | 9/2004 | Azuma |
| 2006/0193601 A1 | 8/2006 | Okada |
| 2006/0225561 A1 | 10/2006 | Kobayashi et al. |
| 2012/0243711 A1 | 9/2012 | Fujita et al. |
| 2013/0182856 A1* | 7/2013 | Setoguchi ............... G06F 17/00 381/56 |
| 2015/0059559 A1 | 3/2015 | Takasaki |
| 2015/0122110 A1 | 5/2015 | Nagasaka |
| 2017/0098439 A1 | 4/2017 | Kojima |

FOREIGN PATENT DOCUMENTS

| | | |
|---|---|---|
| JP | 2003-241755 A | 8/2003 |
| JP | 2004-93732 A | 3/2004 |
| JP | 2004-246145 A | 9/2004 |
| JP | 2004-272851 A | 9/2004 |
| JP | 2006-227110 A | 8/2006 |

* cited by examiner

| | w | 0 | 1 | ... | 10 | ... | 31 | 32 | 33 | ... | 511 |
|---|---|---|---|---|---|---|---|---|---|---|---|
| Waveform Number | w | 0 | 1 | ... | 10 | ... | 31 | 32 | 33 | ... | 511 |
| Tone Color Number | tonen[w] | 0 | 0 | ... | 0 | ... | 0 | 1 | 1 | ... | 15 |
| Waveform Number within Tone Color | twn[w] | 0(1A) | 1(2A) | ... | 10(5B) | ... | 31 (Not Used) | 0(1A) | 1(1B) | ... | 31(9C) |
| Minimum Velocity | vmin[w] | 0 | 61 | ... | 80 | ... | 0 | 0 | 51 | ... | 122 |
| Maximum Velocity | vmax[w] | 60 | 127 | ... | 127 | ... | 0 | 50 | 100 | ... | 127 |
| Minimum Key Number | kmin[w] | 0 | 0 | ... | 100 | ... | 0 | 0 | 0 | ... | 96 |
| Maximum Key Number | kmax[w] | 40 | 40 | ... | 127 | ... | 0 | 20 | 20 | ... | 127 |
| Address from Start of Waveform Region | wave_ad[w] | 0000000H | 0000A00H | ... | 00F2000H | ... | 00FA000H | 00FA000H | 0103200H | ... | 98000000H |
| Waveform Size | wave_sz[w] | 00BA00H | 00C100H | ... | 013800H | ... | 000000H | 009200H | 01A000H | ... | 02C500H |
| Start Address | start_ad[w] | 000080H | 000004H | ... | 000243H | ... | 000000H | 000042H | 000115H | ... | 00115AH |
| Loop Address | loop_ad[w] | 00040AH | 00BB9EH | ... | 0112A0H | ... | 000000H | 008720H | 0114E5H | ... | 024856H |
| End Address | end_ad[w] | 0006BFH | 00C0E5H | ... | 011ED2H | ... | 000000H | 0091E8H | 019AE0H | ... | 02C4CEH |

FIG. 5

| Buffer Number | b | 0 | 1 | ... | 255 |
|---|---|---|---|---|---|
| Buffer Status<br>0...NULL<br>1...Ready For Transfer<br>2...Generating Sound Before Loop<br>3...Generating Sound Within Loop<br>4...Attenuating<br>5...Using Ring Buffer | vs[b] | 1 | 2 | ... | 0 |
| Waveform Buffer Start Address (Absolute) | bsa[b] | 0000000H | 0023C0AH | ... | 0000000H |
| Waveform Buffer Loop Address (Absolute) | bla[b] | 0000EF4H | 002824CH | ... | 0000000H |
| Waveform Buffer End Address (Absolute) | bea[b] | 000109AH | 002AA40H | ... | 0000000H |
| Start Address (Absolute) | sa[b] | 0000A04H | 008422AH | ... | 0000000H |
| Loop Address (Absolute) | la[b] | 00C59EH | 0089E8CH | ... | 0000000H |
| End Address (Absolute) | ea[b] | 00CAE5H | 008E2F4H | ... | 0000000H |
| Transfer Data Pointer (Absolute) | tp[b] | 000C724H | 088897FH | ... | 0000000H |
| Write Pointer (Relative to Buffer) | wp[b] | 004722H | 01320AH | ... | 000000H |
| Read Pointer (Relative to Buffer) | rp[b] | 00484EH | 012D89H | ... | 000000H |
| Waveform Read Margin | rm[b] | 0FFED4H | 000481H | ... | 000000H |

FIG. 6

MUSICAL SOUND GENERATION DEVICE, MUSICAL SOUND GENERATION METHOD, STORAGE MEDIUM, AND ELECTRONIC MUSICAL INSTRUMENT

BACKGROUND OF THE INVENTION

Technical Field

The present invention relates to a musical sound generation device, a musical sound generation method, a storage medium, and an electronic musical instrument.

Background Art

Some sound generators that generate musical sound waveforms by reading waveform data employ a system in which in order to make it possible to use a larger number of waveforms as well as waveform data of a greater length, waveform data that is not used is stored in a tone color waveform region of a secondary storage device (first memory) such as read-only memory (ROM), flash memory, or a hard disk storage device, and sounds are generated by transferring the waveform data to be used to a primary storage device (second memory) such as random-access memory (RAM), which functions as a high-speed waveform buffer that the sound generator can access directly. This, in other words, enables a cost-effective approach in which waveform data of a size greater than the storage capacity of the higher-cost RAM is stored in the lower-cost ROM or the like, and then that waveform data is transferred to the waveform buffer for use in sound production only when necessary.

However, musical sound waveform data can vary considerably in size, and although ideally it would be preferable for regions large enough to be able to store the respective waveform data for all of the sound production channels as-is to be prepared in the waveform buffer of the second memory, in reality, regions large enough to do this are not prepared in the waveform buffer of the second memory in order to keep costs down. Therefore, the waveform buffer is made to function as a so-called ring buffer that eliminates concerns related to the size of the musical sound waveform data, and as a sound source repeatedly reads a prescribed region of the waveform buffer (ring buffer region) corresponding to the target sound production channel while a sound emitter is emitting sound, a CPU sequentially replaces the waveform data in the waveform buffer.

One example of a well-known conventional technology is the technology disclosed in Patent Document 1.
Patent Document 1: Japanese Patent Application Laid-Open Publication No. 2000-122668

However, although the approach described above enables use of a smaller waveform buffer, this approach also results in a large amount of transfer data traffic. In particular, in cases such as when it is necessary to continue transferring a loop segment of a waveform until emission of the corresponding sound is complete, the amount of data transferred can potentially be larger than the size of the original waveforms. For example, in a case in which the size of the waveform buffer (ring buffer) is 16 KB, the size of the waveform data is 30 KB, and the size of the loop segment is 20 KB, if the sound produced in response to a keypress is maintained for a long period of time, the loop segment needs to be repeatedly transferred multiple times, and the total amount of data transferred is 30 KB+(loop count−1)×20 KB. Thus, the amount of data transferred may far exceed the size of the original waveform data. As a result, CPU/memory system bus utilization increases, which in turn leads to degradations in performance such as a decrease in the number of sounds that can be produced simultaneously and an increase in operational latency during use. Moreover, using a higher-performance CPU or bus system to reduce these degradations in performance results in an increase in cost.

Therefore, the advantageous effect of the present invention lies in providing a musical sound generation device or the like in which a first processor satisfactorily transfers waveform data in a first memory to a second memory and a second processor satisfactorily reads the waveform data in the second memory.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a A musical sound generation device, including: a performance operation element for receiving a user operation for musical performance; a first memory storing a plurality of pieces of waveform data; a second memory having an access speed faster than the first memory for temporarily storing data transferred from the first memory; a processor that transfers data stored in the first memory to the second memory; and a sound source circuit including a waveform reader that can read data only from the second memory for generating digital musical sounds, wherein in response to an operation of the performance operation element designating a specific piece of waveform data, the processor determines whether the designated specific piece of waveform data is already in the second memory, and if not, attempts to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element, wherein in attempting to allocate the non-ring buffer region or the ring buffer region, the processor first determines whether the non-ring buffer region sufficient to receive the designated specific piece of waveform data can be allocated in the second memory, and if so, transfers the designated specific piece of waveform data from the first memory to the non-ring buffer region of the second memory, and wherein, if the non-ring buffer region sufficient to receive the designated specific piece of waveform data cannot be allocated in the second memory, the processor attempts to allocate the ring buffer region in the second memory, and if allocated, transfers the designated specific piece of waveform data from the first memory to the ring buffer region of the second memory in the ring-buffer manner so as to be accessible by the waveform reader as the ring buffer.

In another aspect, the present disclosure provides a method executed by a processor in a musical sound generation device that includes, in addition to the processor: a performance operation element for receiving a user operation for musical performance; a first memory storing a plurality of pieces of waveform data; a second memory having an access speed faster than the first memory for temporarily storing data transferred from the first memory; a sound source circuit including a waveform reader that can read data only from the second memory for generating digital musical sounds, the method including: in response to an operation of the performance operation element designating a specific pieces of waveform data, determining whether the designated specific piece of waveform data is already in the second memory, and if not, attempting to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element; in attempting to allocate the non-ring buffer region or the ring buffer region, first determining whether the non-ring buffer region sufficient to receive the designated specific piece of waveform data can be allocated in the second memory, and if so, transferring the designated specific piece of waveform data from the first memory to the non-ring buffer region of the second memory; and if the non-ring buffer region sufficient to receive the designated specific piece of waveform data cannot be allocated in the second memory, attempting to allocate the ring buffer region in the second memory, and if allocated, transferring the designated specific piece of waveform data from the first memory to the ring buffer region of the second memory in the ring-buffer manner so as to be accessible by the waveform reader as the ring buffer.

In another aspect, the present disclosure provides a computer-readable non-transitory storage medium having stored thereon a program to be executable by a processor in a musical sound generation device that includes, in addition to the processor: a performance operation element for receiving a user operation for musical performance; a first memory storing a plurality of pieces of waveform data; a second memory having an access speed faster than the first memory for temporarily storing data transferred from the first memory; a sound source circuit including a waveform reader that can read data only from the second memory for generating digital musical sounds, the program causing the processor to perform the following: in response to an operation of the performance operation element designating a specific pieces of waveform data, determining whether the designated specific piece of waveform data is already in the second memory, and if not, attempting to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element; in attempting to allocate the non-ring buffer region or the ring buffer region, first determining whether the non-ring buffer region sufficient to receive the designated specific piece of waveform data can be allocated in the second memory, and if so, transferring the designated specific piece of waveform data from the first memory to the non-ring buffer region of the second memory; and if the non-ring buffer region sufficient to receive the designated specific piece of waveform data cannot be allocated in the second memory, attempting to allocate the ring buffer region in the second memory, and if allocated, transferring the designated specific piece of waveform data from the first memory to the ring buffer region of the second memory in the ring-buffer manner so as to be accessible by the waveform reader as the ring buffer.

It is to be understood that both the foregoing general description and the following detailed description are exemplary and explanatory, and are intended to provide further explanation of the invention as claimed.

BRIEF DESCRIPTION OF THE DRAWINGS

FIG. 5 illustrates an example of data in a flash memory tone color waveform directory.

FIG. 6 illustrates an example of data in a RAM waveform buffer directory.

DETAILED DESCRIPTION OF THE PREFERRED EMBODIMENTS

An embodiment of the present invention will be described in detail with reference to figures. The present embodiment relates to a musical sound generation device for use in an electronic keyboard instrument, for example, which, in order to reproduce changes in tone color in accordance with performance information such as pitch (key region) and volume (velocity: the speed at which a key is pressed), transfers waveform data ("split waveforms") for each pitch and volume from a tone color waveform region in a first memory constituted by a high-capacity flash memory, for example, to waveform buffers in a second memory constituted by RAM, for example. In this musical sound generation device of the present embodiment, while a CPU, for example, is transferring waveform data in the first memory constituted by the high-capacity flash memory, for example, to the second memory constituted by the RAM, for example, a sound source large-scale integrated circuit (LSI), for example, executes a reading process of reading the waveform data stored in the second memory upon being transferred in the transfer process described above. In this configuration, a controller such as a CPU executes a first determination process of determining whether the waveform data in the first memory can be transferred to a first region among a plurality of regions in the second memory, this first region not including a ring buffer region. Moreover, the controller executes a first transfer process of transferring, to the first region, the waveform data determined by the first determination process to be transferable to the first region. Furthermore, the controller executes a second determination process of determining whether waveform data which has been determined by the first determination process to not be transferable to the first region can be transferred to a second region among the plurality of regions, this second region including a ring buffer region. In addition, the controller executes a second transfer process of transferring, to the second region, the waveform data determined by the second determination process to be transferable to the second region. In the present embodiment, rather than equally dividing the regions for the waveform buffers to assign a fixed size thereto, a single continuous region is dynamically divided so that when producing sound, all of the data for a single waveform can be transferred to a buffer using a single read operation whenever possible. Thus, transfers of looped segments of waveforms can be completed in a single transfer operation, thereby reducing the total waveform transfer load.

Figure 1:
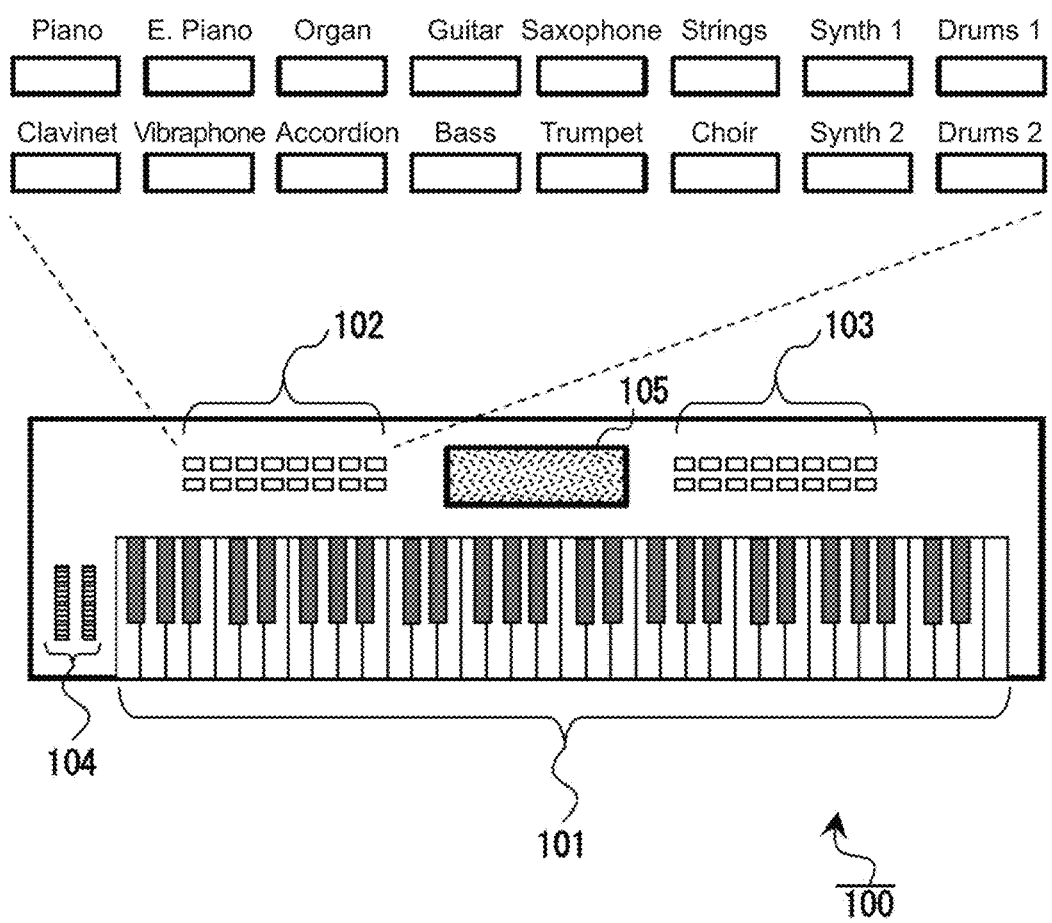
FIG. 1 is an external view of an embodiment of an electronic keyboard instrument according to the present invention.

FIG. 1 is an external view of an embodiment of an electronic keyboard instrument according to the present invention. The present embodiment is implemented as an electronic keyboard instrument 100. The electronic keyboard instrument 100 includes: a keyboard 101 including a plurality of keys (performance operation elements); a switch panel including tone color selection buttons (tone color selection elements) 102 for selecting tone color and feature selection buttons 103 for selecting various features other than tone color; bender/modulation wheels 104 which add various types of modulation (performance effects) such as pitch bending, tremolo, and vibrato; a liquid crystal display (LCD) 105 which displays tone color and information of various settings other than tone color; and the like. The electronic keyboard instrument 100 further includes, in a location such as the rear face, side faces, or back face thereof, speakers (not illustrated in the figure) which emit the musical sounds generated by a performance.

As illustrated in FIG. 1, the tone color selection buttons 102 are a group of buttons for selecting various tone color categories such as the tone color of a piano ("Piano" in the figure), an electronic piano ("E. Piano" in the figure), an organ ("Organ" in the figure), or a guitar ("Guitar" in the figure). The user can press these tone color selection buttons 102 to select any of 16 tone colors, for example.

Figure 2:
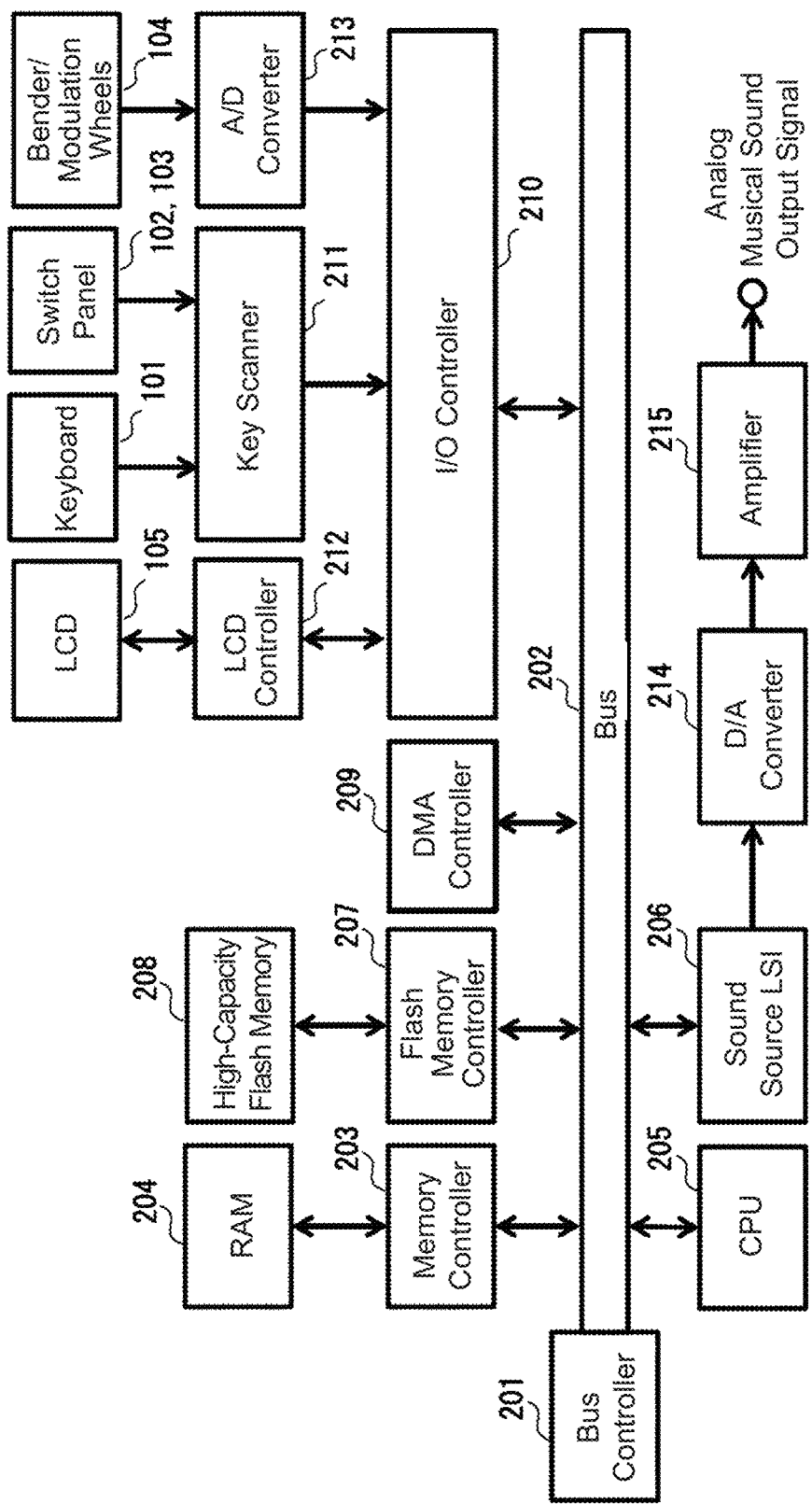
FIG. 2 illustrates an example of a hardware configuration for the embodiment of the electronic keyboard instrument.

FIG. 2 illustrates an example of a hardware configuration for the embodiment of the electronic keyboard instrument 100 illustrated in FIG. 1. In the electronic keyboard instrument 100 illustrated in FIG. 2, the overall system is controlled by a bus controller 201. The bus controller 201 controls the flow of data over a bus 202 and serves to control the priority of devices connected to the bus 202. For example, a RAM 204 connected to the bus 202 via a memory controller 203 is shared by a CPU 205 and a sound source LSI 206. However, whereas the sound source LSI 206 (which is responsible for generating sounds) is configured to have the highest priority because missing data would be unacceptable, access from the CPU 205 can be restricted as necessary.

The CPU 205, the sound source LSI 206, a flash memory controller 207, the memory controller 203, a direct memory access (DMA) controller 209, and an input/output (I/O) controller 210 are connected to the bus 202. Furthermore, a key scanner 211, an LCD controller 212, and an analog-to-digital (A/D) converter 213 are also connected to the bus 202 via the I/O controller 210.

The CPU 205 is a first processor which executes an overall control process for the electronic keyboard instrument 100. The sound source LSI 206 is a second processor which is a large-scale integrated circuit dedicated for generating musical sounds.

The flash memory controller 207 is an interface circuit which connects a high-capacity flash memory 208 to the bus 202. The high-capacity flash memory 208 stores waveform data, control programs, static data, and the like.

The memory controller 203 is an interface circuit which connects the RAM 204 to the bus 202. The RAM 204 stores waveform data, control programs, and other types of data on an as-needed basis. The RAM 204 is also used as a working region for the CPU 205 and a digital signal processor (DSP) which is built into the sound source LSI 206.

The I/O controller 210 is an interface circuit which connects peripheral devices such as the keyboard 101, the tone color selection buttons 102, the feature selection buttons 103, the bender/modulation wheels 104, and the LCD 105 illustrated in FIG. 1 to the bus 202. The key scanner 211 connected to the I/O controller 210 scans the state of the keyboard 101 and switch panel components such as the tone color selection buttons 102 and the feature selection buttons 103 illustrated in FIG. 1 and sends the obtained scanning results to the CPU 205 via the I/O controller 210 and the bus 202. The LCD controller 212 connected to the I/O controller 210 controls the LCD 105 device illustrated in FIG. 1. The A/D converter 213 detects the operation position of the bender/modulation wheels 104 illustrated in FIG. 1.

The DMA controller 209 controls DMA transfers between the high-capacity flash memory 208 and the RAM 204.

Figure 3:
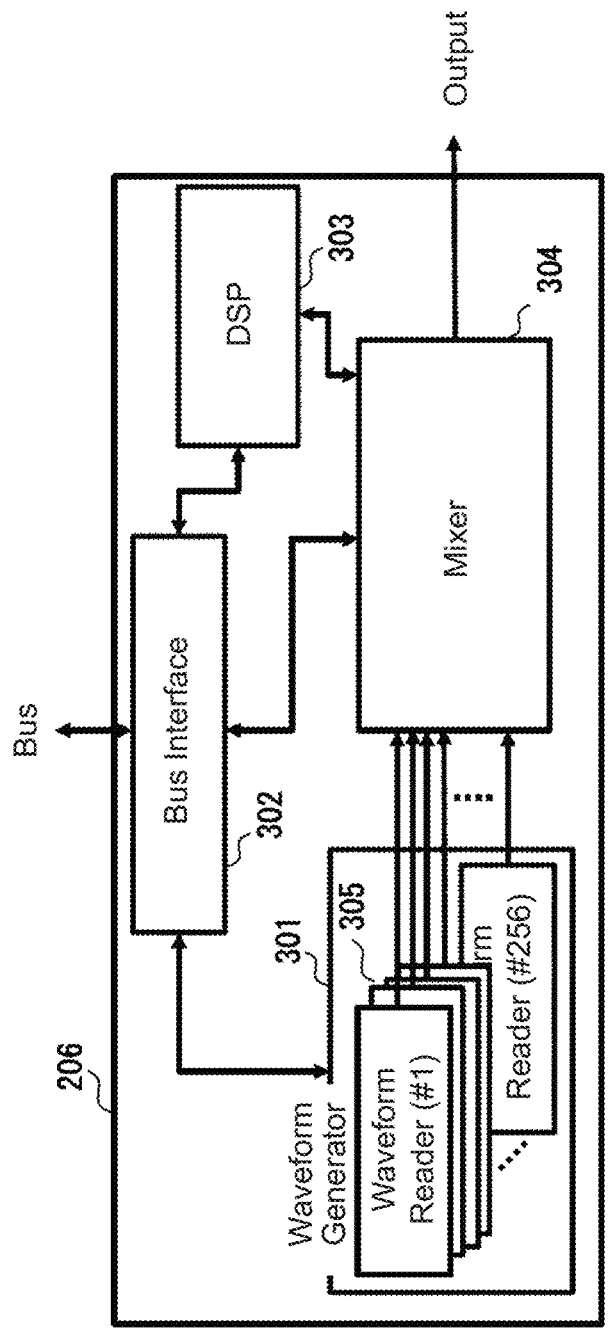
FIG. 3 is a block diagram illustrating a sound source LSI.

FIG. 3 is a block diagram illustrating the sound source LSI 206. The sound source LSI 206 includes a waveform generator 301, a bus interface 302, a DSP 303, and a mixer 304. The waveform generator 301 includes waveform readers 305 constituted by 256 oscillators numbered from #1 to #256 which read waveform data from the RAM 204 illustrated in FIG. 2 to generate musical sound waveforms. The bus interface 302 is a bus interface circuit which connects the waveform generator 301, the DSP 303, and the mixer 304 to the bus 202 and controls communication between these components and the CPU 205 and RAM 204 illustrated in FIG. 2. The DSP 303 is a digital signal processing circuit which applies audio effects to musical sound signals. The mixer 304 controls the overall flow of musical sound signals by mixing musical sound signals output by the waveform generator 301, sending these signals to the DSP 303, and receiving audio signals from the DSP 303, and then outputs the resulting signals to an external unit. The digital musical sound signals from the mixer 304 are converted to analog musical sound signals by a D/A converter 214 illustrated in FIG. 2. These analog musical sound signals are amplified by an amplifier 215 and then output as an analog musical sound output signal.

The high-capacity flash memory 208 illustrated in FIG. 2 is a high-capacity, low-cost memory device such as NAND flash memory. Note also that a hard disk storage device or a disk-based device on a network or the cloud may be used instead of this high-capacity flash memory 208. The high-capacity flash memory 208 primarily stores the following types of data:

Waveform data for all tone colors
Parameter data for all tone colors
Programs executed by the CPU 205 and DSP 303, as well as data used by those programs
Musical data
User settings data The waveform data is linear PCM-formatted data with 16 bits per word, for example.

Although the CPU 205 can access any address of the abovementioned data stored in the high-capacity flash memory 208, the sound source LSI 206 cannot access this data, and therefore the waveform data in the high-capacity flash memory 208 must be transferred to the RAM 204. However, because the storage capacity of the RAM 204 is less than that of the high-capacity flash memory 208, it is not possible to transfer all of the data to buffer regions for each sound production channel in the RAM 204. Therefore, the data stored in the RAM 204 must be sequentially replaced as necessary. The present embodiment is particularly focused on the waveform data among this data that needs to be replaced, but the details of controlling this waveform data will be described later.

Next, the overall operation of the present embodiment as illustrated in FIGS. 1 to 3 will be described. First, in the present embodiment, a performer can press one of the tone color selection buttons 102 illustrated in FIG. 1 to select any of the 16 tone colors illustrated in FIG. 1. Each tone color includes a maximum of 32 types of waveforms per respective tone color, and this waveform data is stored in the high-capacity flash memory 208. The tone range (key numbers) and velocity range for each tone color are divided up two-dimensionally, and the abovementioned maximum of 32 waveforms are assigned to the respective split (divided) areas. In other words, a control process is executed to determine a single waveform that should be read on the basis of two factors: keypress speed (velocity) and key number (key number on the keyboard 101).

Figure 4:
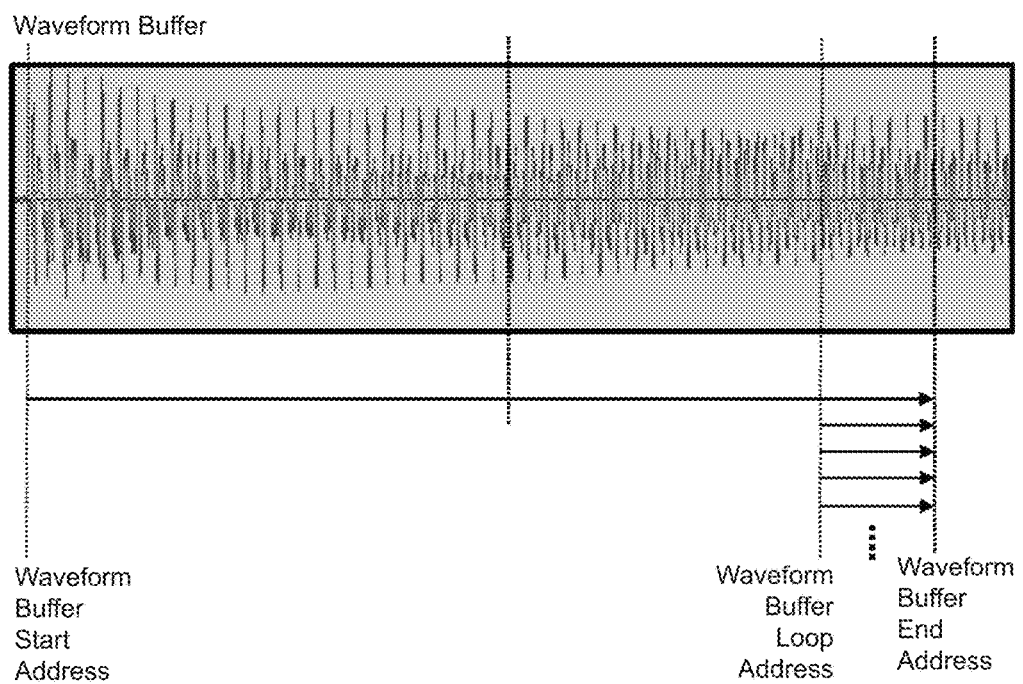
FIG. 4 is an explanatory drawing of a looped waveform read operation.

The sound source LSI 206 of the present embodiment can execute a looping process when reading waveforms. FIG. 4 is an explanatory drawing of this looped waveform read operation. Execution of this looping process is controlled on the basis of the following three types of address information.

1. Waveform buffer start address: The address from which the sound source LSI 206 starts reading.
2. Waveform buffer end address: The last address read by the sound source LSI 206.
3. Waveform buffer loop address: An address between the waveform buffer start address and the waveform buffer end address from which the next read operation begins when the current waveform read operation reaches the waveform buffer end address.

As illustrated in FIG. 4, the waveform buffer includes a non-loop segment which extends from the waveform buffer start address to immediately before the waveform buffer loop address, and a loop segment which extends from the waveform buffer loop address to the waveform buffer end address. When reading the waveform data stored from the waveform buffer start address to the waveform buffer end address stored in the waveform buffer, the loop segment extending from the waveform buffer loop address to the waveform buffer end address is read repeatedly. Moreover, when the waveform buffer loop address is the same as the waveform buffer end address, this looping process is not executed, and sound production stops as soon as the read pointer reaches the waveform buffer end address.

FIG. 5 illustrates an example of data in a flash memory tone color waveform directory. The flash memory tone color waveform directory is a table containing information about all of the waveform data stored in the high-capacity flash memory 208. More specifically, this table contains the following information: a "Minimum Key Number" field and a "Maximum Key Number" field that define the key ranges respectively used by each waveform in each tone color as determined by a "Tone Color Number" field and a "Waveform Number within Tone Color" field; a "Minimum Velocity" field and a "Maximum Velocity" field that are the velocity range information respectively used by each of the waveforms; an "Address from Start of Waveform Region" field that indicates which address in the high-capacity flash memory 208 each waveform is actually stored at; "Waveform Size" field that indicates a length of the waveform; and "Start Address", "Loop Address", and "End Address" fields that are used during read operations. This table is loaded into the RAM 204 when the power is turned on.

FIG. 6 illustrates an example of data in a RAM waveform buffer directory. The RAM waveform buffer directory is a table containing information about the waveform data currently stored in the waveform buffers in the RAM 204. This table stores the following information for each buffer directory as determined by a buffer number b: a "Buffer Status vs[b]" field indicating the usage state of the corresponding waveform buffer b; "Waveform Buffer Start Address bea[b]", "Waveform Buffer Loop Address bla[b]", and "Waveform Buffer End Address bea[b]" fields respectively indicating the start position, loop position and end position in the waveform buffer b itself; "Start Address sa[b]", "Loop Address la[b]", and "End Address ea[b]" fields respectively indicating the start position, loop position and end position in a tone color waveform region in the high-capacity flash memory 208 from which data corresponding to the waveform buffer b is transferred; a "Transfer Data Pointer" field which is the read address of the waveform in the high-capacity flash memory 208 which is currently being transferred by the CPU 205; a "Write Pointer" field which is the address in the RAM 204 to which data is transferred and written by the CPU 205; a "Read Pointer" field which is the address in the RAM 204 currently being read by the sound source LSI 206; and a "Waveform Read Margin" field which is the difference between the latest values of the write pointer and the read pointer.

In the example in FIG. 6, 256 sets of buffer information are prepared in the table. However, this does not necessarily mean that the waveform buffer in the RAM 204 is always divided into 256 buffers. In an initial state, there is a single buffer representing one continuous ready-for-transfer region, and the buffer status vs[b] of this buffer is 1. In this state, the buffer start address and buffer end address fields of this buffer store the start and end of the overall buffer region.

Here, the buffer status for all of the other buffers is NULL because these other buffers do not currently correspond to specific RAM spaces (address spaces in the RAM 204).

Figure 7:
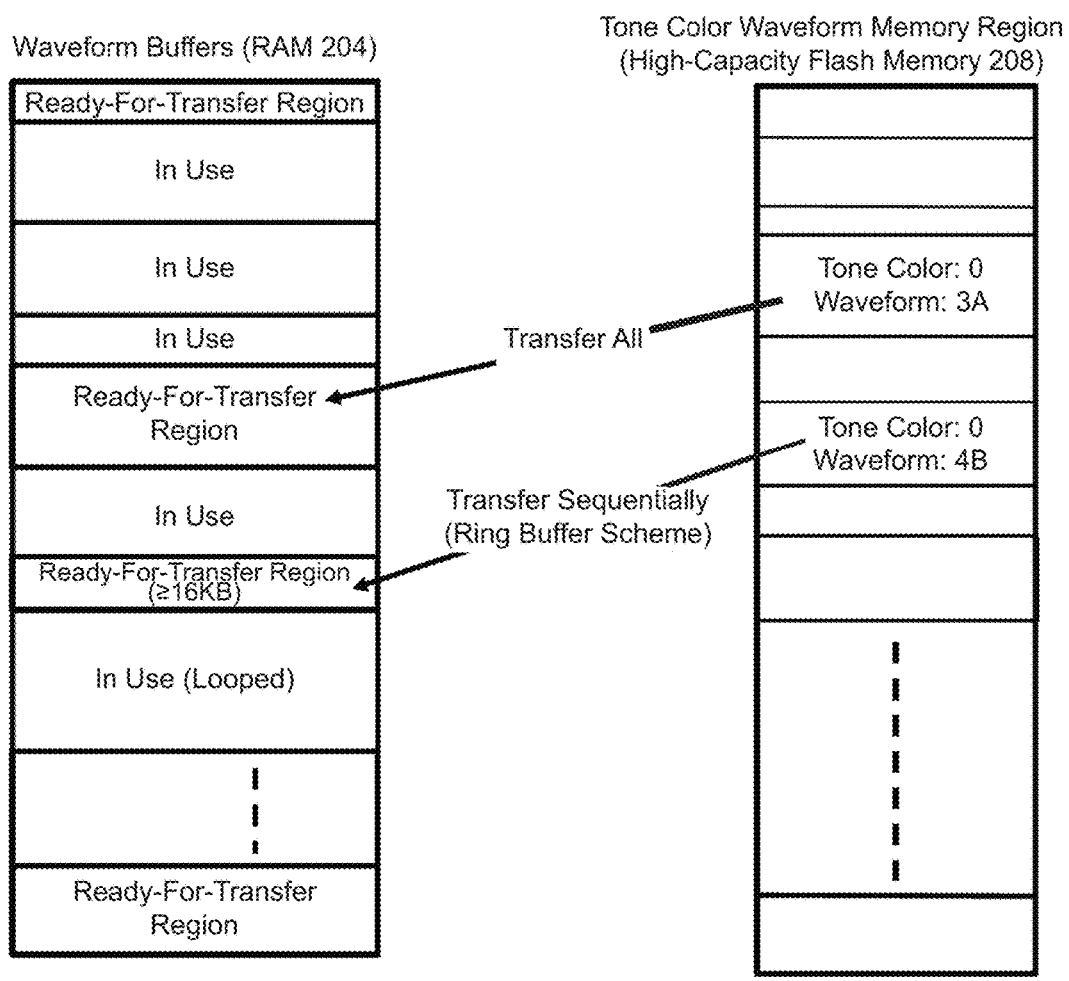
FIG. 7 is an explanatory drawing of an operation for transferring tone color waveforms from a tone color waveform region in a high-capacity flash memory to a waveform buffer in RAM.

FIG. 7 is an explanatory drawing of an operation for transferring tone color waveforms from the tone color waveform region of the high-capacity flash memory 208 to the waveform buffer in the RAM 204. First, when a musical performance begins, the numbers of the waveforms that need to be transferred are checked. To do this, first, regardless of whether the waveforms corresponding to those numbers are currently being used or are in a transferable state, the check is performed to determine whether the desired waveforms are already remaining in the RAM 204. If there is the target waveform remaining in the RAM 204, no waveforms are transferred, and the remaining waveforms are reused as cached waveforms.

If no cached waveforms are present, next, a search is performed to determine whether there are any empty regions larger than the size of the waveforms. If such a region is found, that ready-for-transfer region is set as the waveform buffer, and the waveform transfer is started. Here, if a single ready-for-transfer region of sufficient size is found, that region is used. Meanwhile, when no single ready-for-transfer region of sufficient size is found, a search is performed to find two or more continuous ready-for-transfer regions, and if the total size of those regions is sufficient, those regions are used. In this case, the directory information of the waveform buffers is merged together into a single entry, and the status of the empty directories is set to NULL.

When a suitable region is still not found, in the present embodiment a search is performed to find an empty region of 16 KB in size (the size required for a ring buffer). The found region is then used as a ring buffer in order to proceed with sound production. In this ring buffer scheme, the waveform buffer is treated as a ring in order to allocate an effectively infinite memory space. In this case, a control process is executed to ensure that the address of the write pointer of the CPU 205 never passes or gets passed by the address of the read pointer of the sound source LSI 206. When not even such a ring buffer region can be found, sound production is aborted.

Note that if the write pointer wp[v] for a waveform buffer v passes the read pointer rp[v] of the sound source LSI 206, the waveform data read by the sound source LSI 206 will suddenly and non-continuously return to past data, thereby resulting in noise. From a musical perspective, such noise is unacceptable.

Therefore, in the present embodiment, the number of words of data (addresses), i.e., the difference between the value of the write pointer wp[v] and the value of the read pointer rp[v], that indicates how many read pointers rp[v] within the waveform buffer v can be read without adding waveform data is managed as a waveform read margin. In the present embodiment, when this waveform read margin becomes less than or equal to a prescribed value, a damping process (a gradual silencing process) is applied to the voice channel emitting the corresponding musical sound, and then as soon as sound is no longer being emitted after that process having been applied, the read from the waveform buffer v for that voice channel is stopped, thereby making it possible to prevent noise from occurring.

In the present embodiment, the threshold value of the waveform read margin is not a fixed value and instead depends on the playback pitch. Here, the damping process is applied when the waveform read margin becomes less than one kiloword while playing a fundamental pitch, when the waveform read margin becomes less than two kilowords while playing a pitch one octave higher, or when the waveform read margin becomes less than 512 words while playing a pitch one octave lower.

With regard to the speed of the damping process, it is sufficient if the sound can be ceased before the read margin portion of the waveform data that has already been transferred to the waveform buffer v is completely read even if the read continues as-is without the waveform being replaced. This speed depends on the playback pitch.

Figure 8:
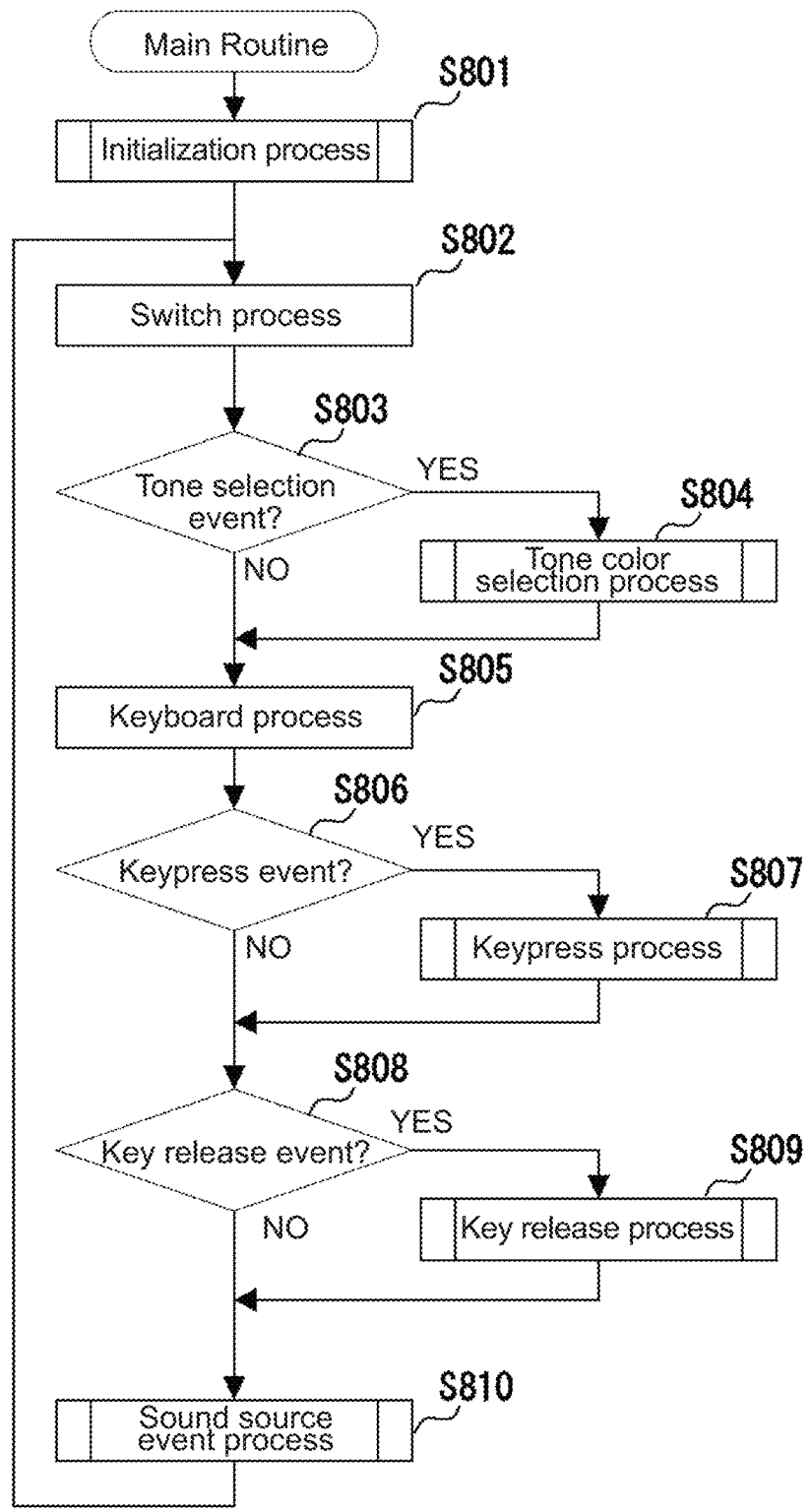
FIG. 8 is a flowchart illustrating an example of a main routine process.

FIG. 8 is a flowchart illustrating an example of a main routine process within the control process executed by the CPU 205 illustrated in FIG. 2. When the electronic keyboard instrument 100 illustrated in FIG. 1 is powered on using the feature selection buttons 103, the CPU 205 starts the main routine illustrated in the flowchart in FIG. 8 and executes an initialization process to initialize the components of the device (step S801). Once the initialization process in step S801 is complete, the following processes are repeatedly executed: a switch process of getting the user-configured operation states by the user of the tone color selection buttons 102 and the feature selection buttons 103 illustrated in FIG. 1 (step S802); a process of, on the basis of the results of the process in step S802, detecting tone color selection events and selecting tone color when the tone color selection buttons 102 are operated (step S803→S804); a keyboard process of catching keypress events and key release events when the user plays the keyboard 101 illustrated in FIG. 1 (step S805); a keypress event detection and keypress process based on the results of the process in step S805 (step S806→S807); a key release event detection and key release process based on the results of the process in step S805 (step S808→S809); and a sound source event process of processing events from the sound source LSI 206 (step S810).

Figure 9A:
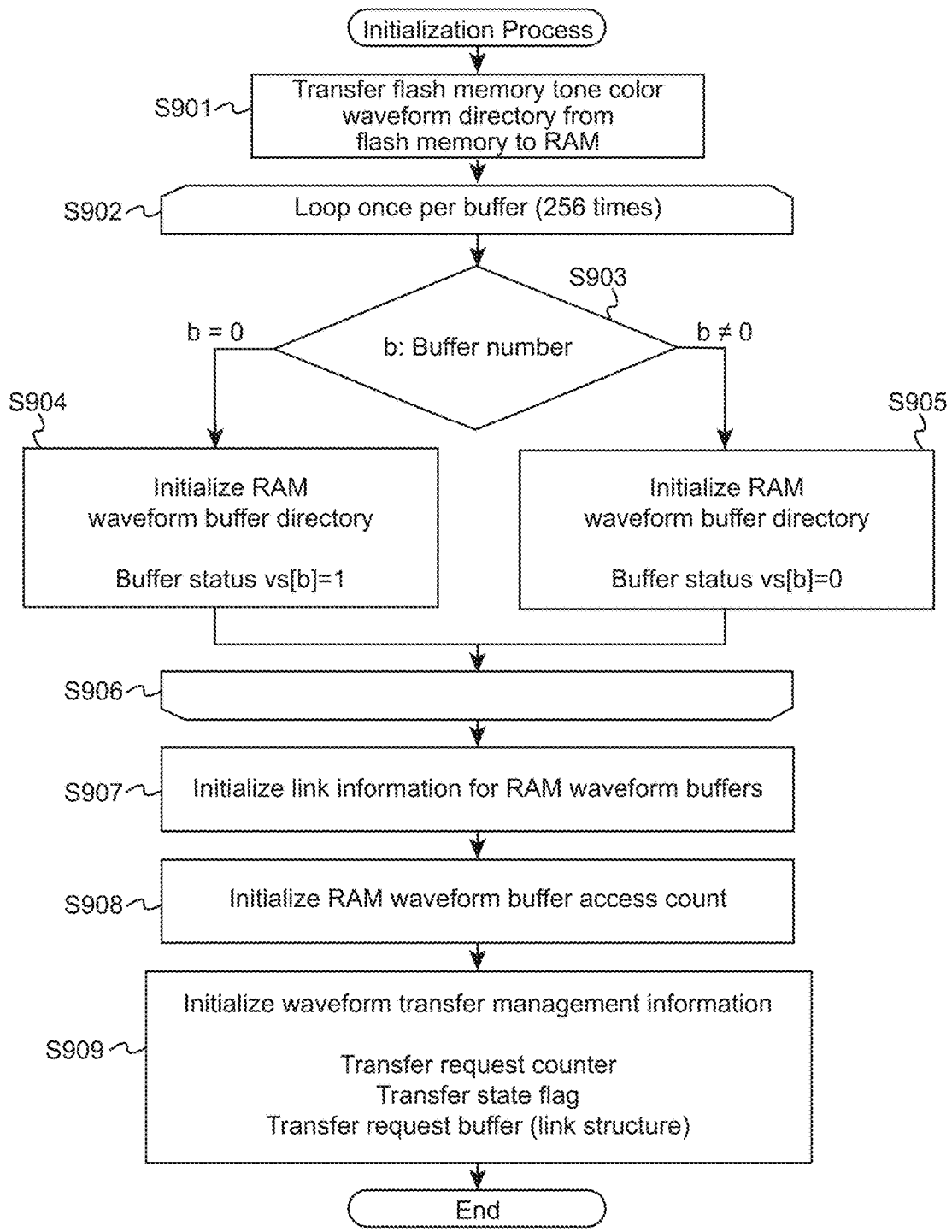
FIG. 9A is a flowchart illustrating a detailed example of an initialization process and FIG. 9B is a flowchart illustrating a detailed example of a tone color selection process.

FIG. 9A is a flowchart illustrating a detailed example of the initialization process of step S801 in FIG. 8. First, the CPU 205 transfers the tabular data for the flash memory tone color waveform directory (see FIG. 5) from the high-capacity flash memory 208 to a designated address in the RAM 204 (step S901).

Steps S902 and S906 respectively represent the beginning and the end of a looped process. The repeating control processes of steps S902 and S906 are used to execute this looped process a number of times equal to the number of buffers (256). In step S903 of this looped process, the value of the buffer number b (see the RAM waveform buffer directory in FIG. 6) is determined.

If the buffer number b is equal to 0, the CPU 205 initializes the RAM waveform buffer directory illustrated in FIG. 6 and stored in the RAM 204, and then sets the buffer status corresponding to buffer number b=0 in that directory to Ready For Transfer (1) (step S903→S904). Then, the CPU 205 continues the looped process (step S904→S906).

If the buffer number b is not equal to 0, the CPU 205 initializes the RAM waveform buffer directory and then sets the buffer status corresponding to buffer number b in that directory to NULL (0) (step S903→S905). Then, the CPU 205 continues the looped process (step S905→S906).

Once the looped process of steps S902 to S906 is complete, the CPU 205 initializes link information for the waveform buffers in the RAM 204 (step S907). This link information provides buffer numbers indicating which RAM waveform buffers are being used in order from the beginning of the waveform buffer region in the RAM 204. During initialization, there is a single waveform region, so the first number of the link information is set to 0.

Next, the CPU 205 initializes a count of access operations to the waveform buffers in the RAM 204. This access count is information indicating how many of the waveform readers 305 (see FIG. 3) are accessing the waveform data specified by the buffer number b in the RAM waveform buffer directory (see FIG. 6).

Next, the CPU 205 initializes a transfer request counter, a transfer state flag, and a transfer request buffer (link structure) for managing transfer of waveforms from the tone color waveform region of the high-capacity flash memory 208 to the waveform buffers (S909). The transfer request counter is information for managing how many buffers currently have waveform data being transferred thereto among the buffers in the RAM waveform buffer directory for the waveform buffers in the RAM 204. The transfer state flag is a flag information for determining whether waveform data is currently being transferred from the tone color waveform region to the waveform buffers. The transfer request buffer is a buffer for managing the waveform buffer to which a waveform is transferred next from the tone color waveform region. Finally, the CPU 205 completes the initialization process of step S801 in FIG. 8, which is illustrated in the flowchart in FIG. 9A.

Figure 9B:
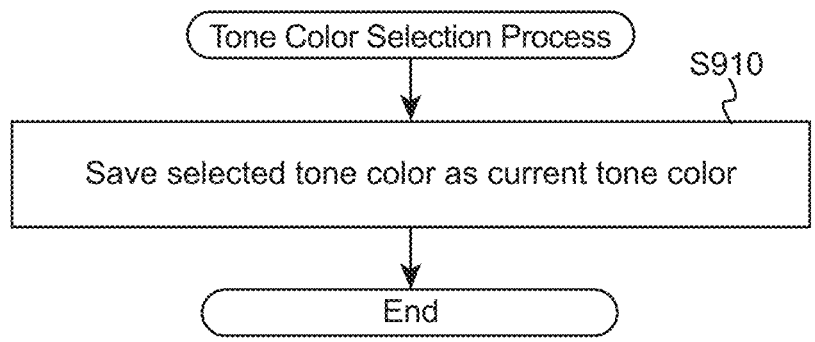

FIG. 9B is a flowchart illustrating a detailed example of the tone color selection process of step S804 in FIG. 8. In this process, the CPU 205 saves a tone color number specified by an operation of the tone color selection buttons 102 illustrated in FIG. 1 to a working memory or the like within the CPU 205 for later use in the keypress process or the like (step S910).

Figure 10:
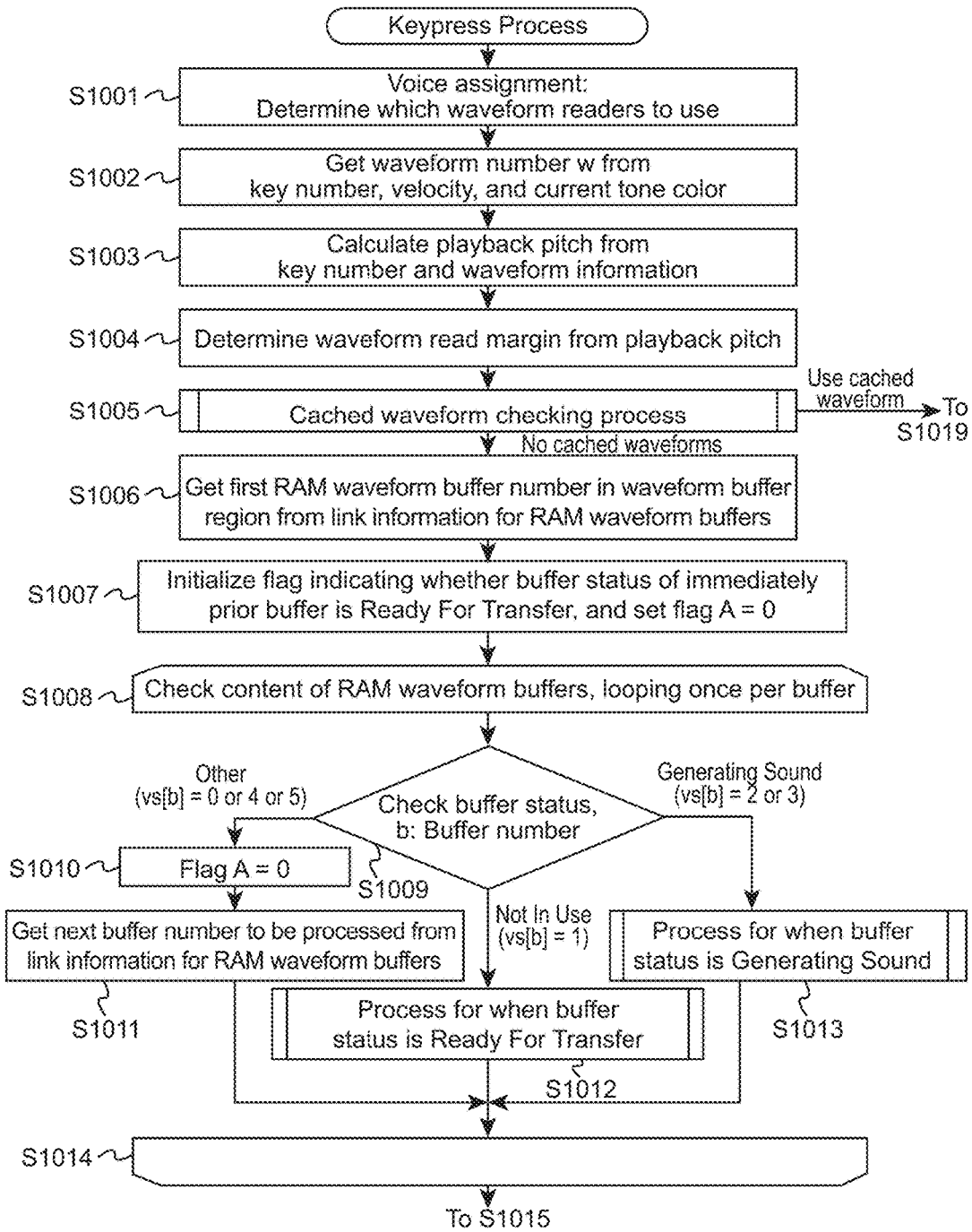
FIG. 10 is a (first) flowchart illustrating a detailed example of a keypress process.
Figure 11:
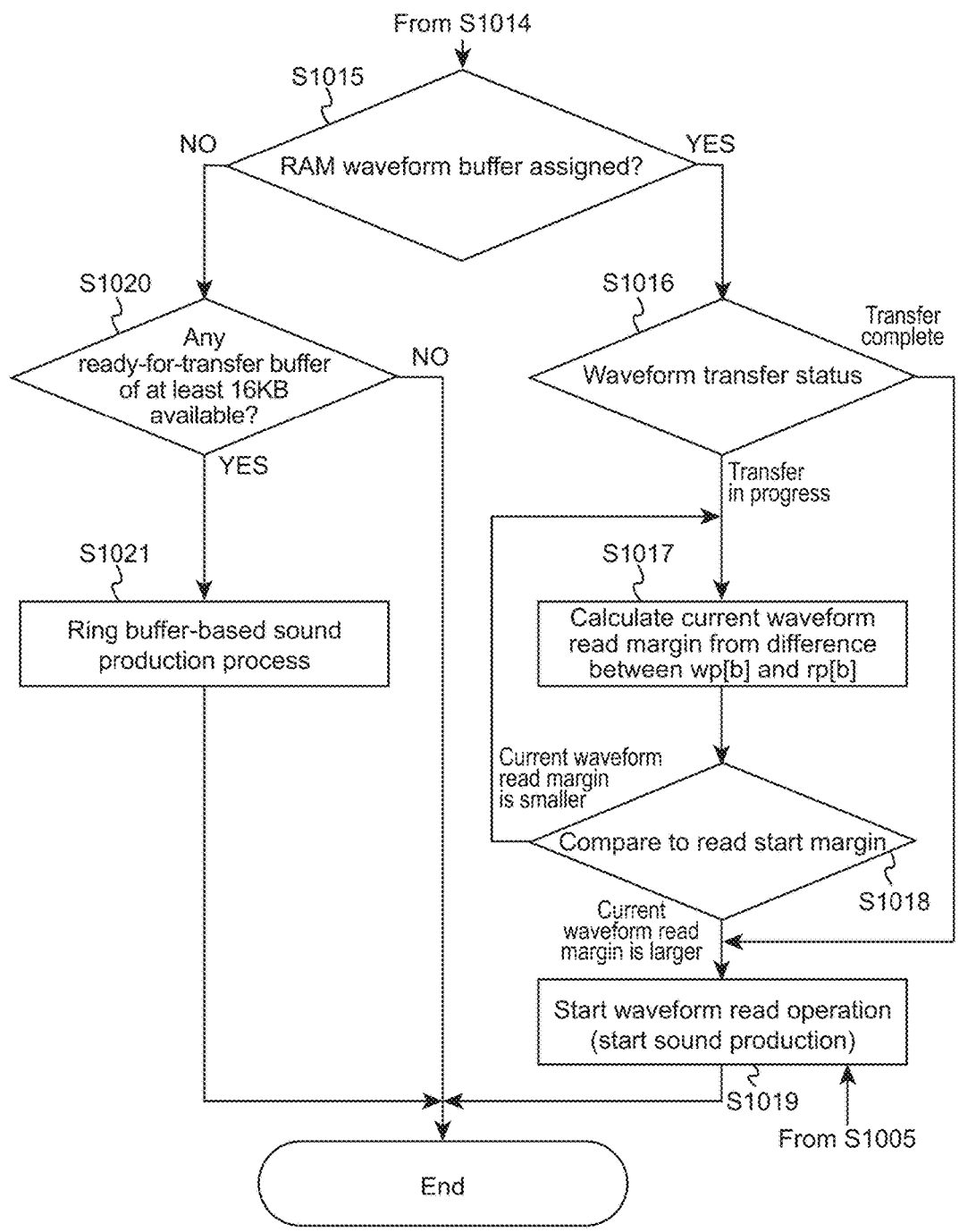
FIG. 11 is a (second) flowchart illustrating the detailed example of the keypress process.

FIGS. 10 and 11 are flowcharts illustrating a detailed example of the keypress process of step S807 in FIG. 8. Here, the CPU 205 converts performance information (key position and keypress force) based on keypresses which occur as the key is played to key numbers and velocities and also executes a control process based on these values.

First, the CPU 205 executes a voice assignment to determine which of the waveform readers 305 (FIG. 3) in the sound source LSI 206 to use to generate the sound corresponding to the current keypress (step S1001).

Next, based on the key number, velocity, and the current tone color number, the CPU 205 gets the waveform number w which should be transferred from the tone color waveform region to a waveform buffer (step S1002).

Then, the CPU 205 calculates a playback pitch based on the key number and waveform information obtained from the waveform number w (step S1003).

Next, the CPU 205 determines a waveform read margin (see FIG. 6) on the basis of the playback pitch (step S1004).

Then, the CPU 205 executes a cached waveform checking process to check whether the waveform data for the waveform number obtained from the keypress information is already present in a waveform buffer in the RAM 204 (step S1005). The details of this process will be described later in reference to FIG. 13D.

If the results of the cached waveform checking process in step S1005 indicate that the waveform data is already present in one of the waveform buffers in the RAM 204, the CPU 205 uses that waveform data as a cached waveform and initiates a waveform read operation by the waveform readers 305 (FIG. 3) in the sound source LSI 206 (step S1005 in FIG. 10→step S1019 in FIG. 11). Then, the CPU 205 ends the keypress process of step S807 in FIG. 8, which is illustrated in the flowcharts in FIGS. 10 and 11.

Meanwhile, if the results of the cached waveform checking process in step S1005 indicate that cached waveform data is not present in the RAM 204, the CPU 205 executes a process of checking for waveform buffers that are ready for transfer of waveform data. Here, the CPU 205 gets the first buffer number in the waveform buffer region of the RAM 204 from the link information for the waveform buffers in the RAM 204 (step S1005→S1006).

Next, the CPU 205 initializes, to a value of 0, a flag (hereinafter, a "flag A") indicating whether the buffer status of the immediately prior buffer number was Ready For Transfer in preparation for the looped process executed on the waveform buffers in the RAM 204 (step S1007).

Steps S1008 and S1014 respectively represent the beginning and the end of a looped process. Using looping control processes in steps S1008 and S1014, the CPU 205 repeatedly executes the following sequence of processes from step S1009 to S1013 a number of times equal to the number of buffers in the RAM waveform buffer directory (FIG. 6).

In this sequence of processes, the CPU 205 first determines the buffer status (FIG. 6) corresponding to the buffer number b obtained from the link information (step S1009).

If the buffer status is NULL (0), Attenuating (4), or Using Ring Buffer (5) (see FIG. 6), the CPU 205 sets the flag A to 0 (step S1010).

Next, the CPU 205 gets the next buffer number to be processed from the link information for the waveform buffers in the RAM 204 (step S1011). Then, the CPU 205 continues this repeating process (step S1011→S1014).

If the buffer status is Ready For Transfer (1) (see FIG. 6), the CPU 205 executes a process for when buffer status is Ready For Transfer (step S1012). The details of this process will be described later in reference to FIG. 12. Then, the CPU 205 continues this repeating process (step S1012→S1014).

If the buffer status is Generating Sound (2 or 3) (see FIG. 6), the CPU 205 executes a process for when buffer status is Generating Sound (step S1013). The details of this process will be described later in reference to FIG. 13C. Then, the CPU 205 continues this repeating process (step S1013→S1014).

Once the repeating process of steps S1008 to S1014 as described above is complete, the CPU 205 determines whether any of the buffer numbers in the RAM waveform buffer directory (FIG. 6) have been assigned (step S1015 in FIG. 11).

Upon determining in step S1015 that a buffer number b has been assigned, the CPU 205 determines whether waveform data is currently being transferred to the waveform buffer corresponding to that buffer number b (step S1015→S1016 in FIG. 11).

Upon determining in step S1016 that the transfer has been completed, the CPU 205 initiates a waveform read operation by the waveform readers 305 (FIG. 3) in the sound source LSI 206 (step S1016→S1019). Then, the CPU 205 ends the keypress process of step S807 in FIG. 8, which is illustrated in the flowcharts in FIGS. 10 and 11.

Meanwhile, upon determining in step S1016 that data is currently being transferred, the CPU 205 repeatedly calculates the current waveform read margin as the difference between a write pointer wp[b] and a read pointer rp[b] corresponding to the buffer number b (step S1017) and then determines whether that current waveform read margin has become greater than a waveform read start margin threshold value (step S1018). Upon eventually determining in step S1018 that the current waveform read margin has become greater than the waveform read start margin threshold value, the CPU 205 initiates a waveform read operation by the waveform readers 305 (FIG. 3) in the sound source LSI 206 (step S1018→S1019). Then, the CPU 205 ends the keypress process of step S807 in FIG. 8, which is illustrated in the flowcharts in FIGS. 10 and 11.

Meanwhile, upon determining in step S1015 that no buffer numbers have been assigned, the CPU 205 determines from the working memory or the like within the CPU 205 whether there are any ready-for-transfer buffers of at least 16 KB in size (step S1015→S1020).

If the determination in step S1020 yields YES, the CPU 205 executes a ring buffer-based sound production process (step S1020→S1021). Then, the CPU 205 ends the keypress process of step S807 in FIG. 8, which is illustrated in the flowcharts in FIGS. 10 and 11.

If the determination in step S1020 yields NO, the CPU 205 aborts the sound production process and ends the keypress process of step S807 in FIG. 8, which is illustrated in the flowcharts in FIGS. 10 and 11.

Figure 13A:
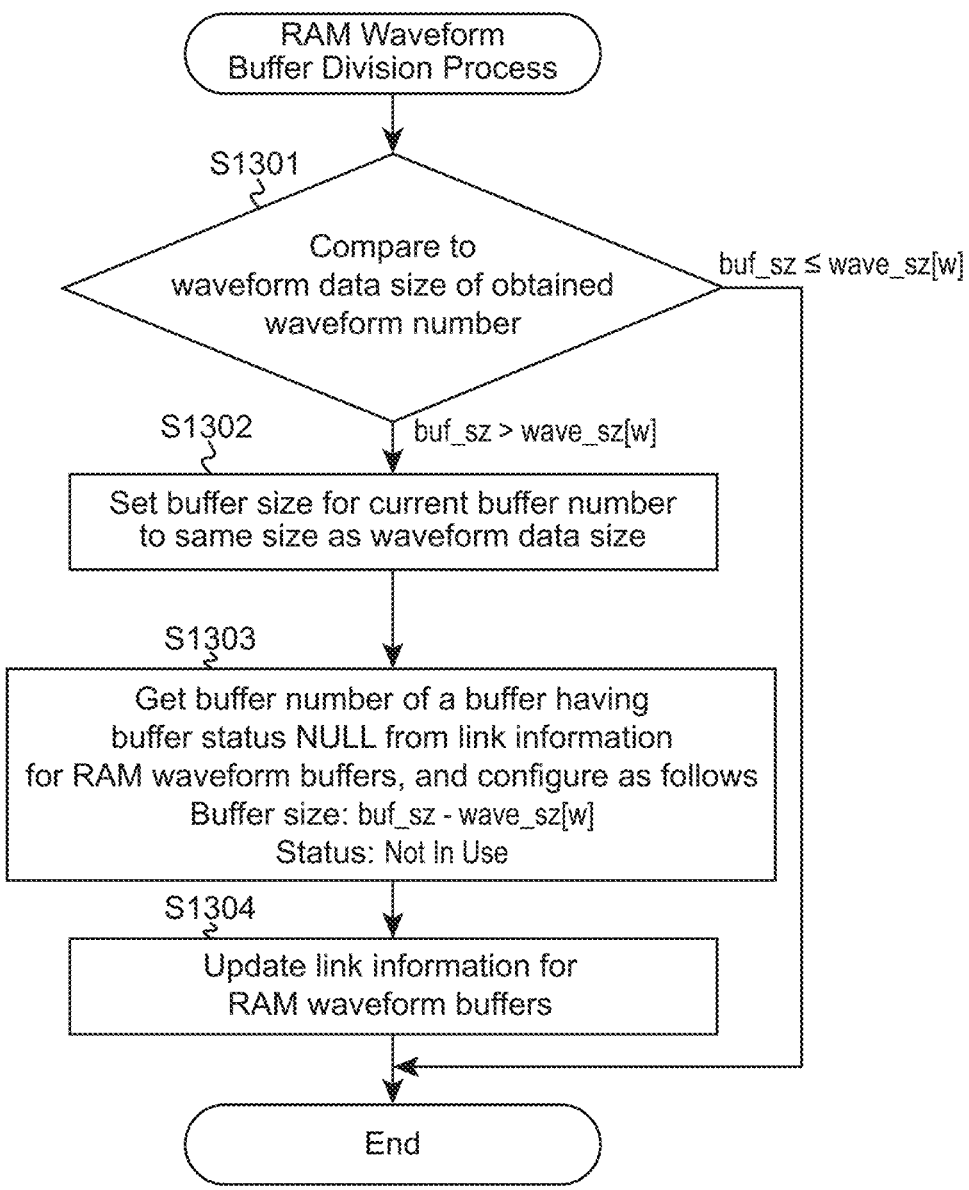
FIGS. 13A, 13B, 13C and 13D are flowcharts illustrating detailed examples of a RAM waveform buffer division process, a RAM waveform buffer merging process, a process for when buffer status is Generating Sound, and a cached waveform checking process.
Figure 13B:
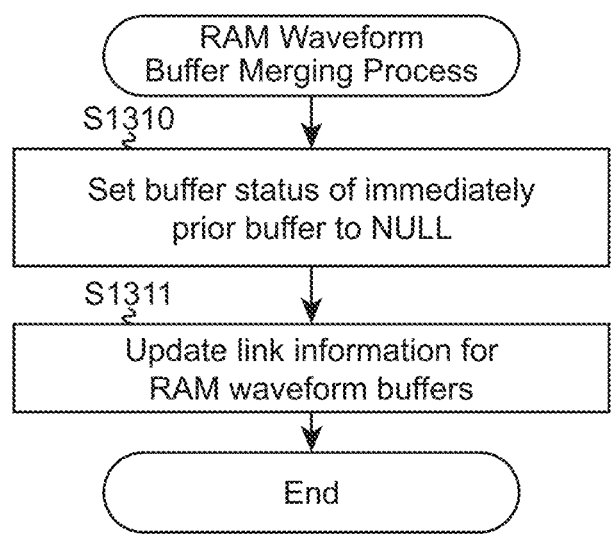
Figure 13C:
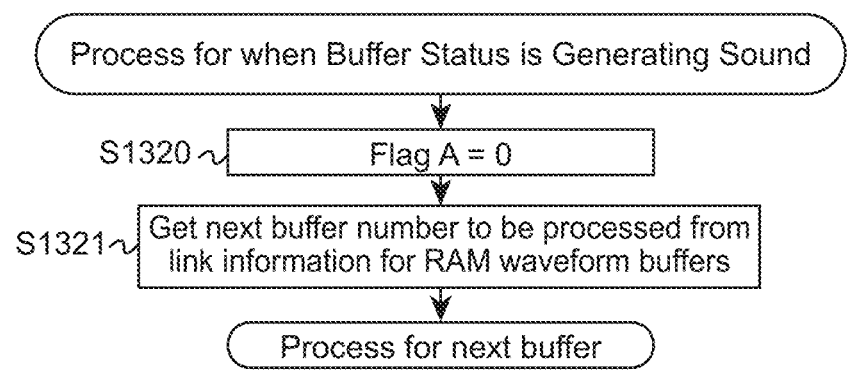
Figure 13D:
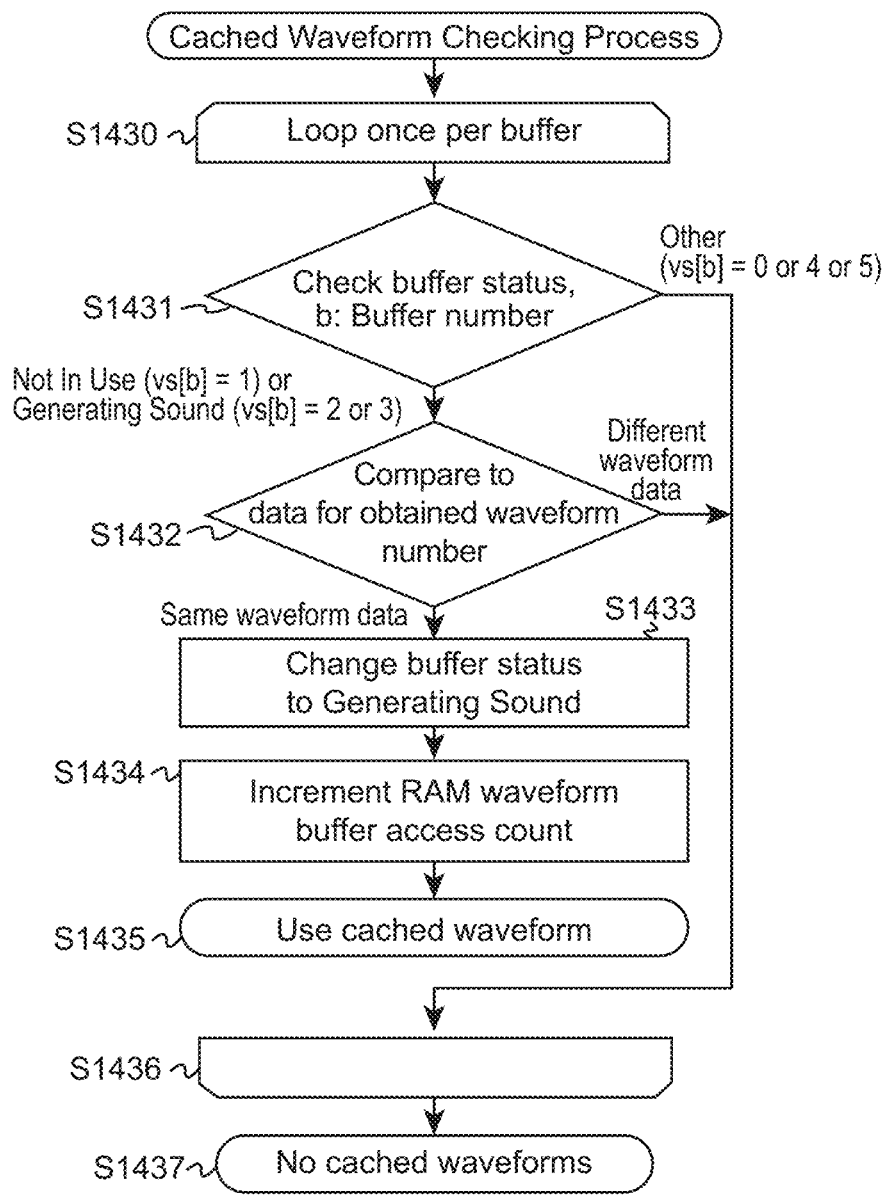

FIG. 13D is a flowchart illustrating a detailed example of the cached waveform checking process of step S1005 in FIG. 10.

Steps S1430 and S1436 respectively represent the beginning and the end of a looped process. Using repeating control processes in steps S1430 and S1436, the CPU 205 repeatedly executes the following sequence of processes from step S1431 to S1435 a number of times equal to the number of buffers in the RAM waveform buffer directory (FIG. 6).

In this sequence of processes, the CPU 205 first determines the buffer status (FIG. 6) corresponding to a buffer number b obtained from the link information (step S1431).

If the buffer status is NULL (0), Attenuating (4), or Using Ring Buffer (5) (see FIG. 6), the CPU 205 immediately ends the process for the current buffer number b and then proceeds to the process for the next buffer number (step S1431→S1436).

If the buffer status is Ready For Transfer (1) or Generating Sound (2 or 3) (see FIG. 6), the CPU 205 determines whether the waveform data for the waveform number obtained from the keypress information and the waveform data in the waveform buffer having the current buffer number b in the RAM waveform buffer directory are the same (step S1432).

Upon determining in step S1432 that the pieces of waveform data are different, the CPU 205 immediately ends the process for the current buffer number b and then proceeds to the process for the next buffer number (step S1432→S1436).

On the other hand, upon determining in step S1432 that the pieces of waveform data are the same, the CPU 205 changes the buffer status to Generating Sound (step S1433).

Next, the CPU 205 increments the RAM waveform buffer access count (step S1434).

Then, after enabling use of the cached waveform corresponding to the current buffer number b, the CPU 205 ends the cached waveform checking process of step S1005 in FIG. 10, which is illustrated in the flowchart in FIG. 13D.

If step S1436 is reached after having completed all iterations of the repeated process, the CPU 205 determines that no cached waveforms are present and ends the cached waveform checking process of step S1005 in FIG. 10, which is illustrated in the flowchart in FIG. 13D.

Figure 12:
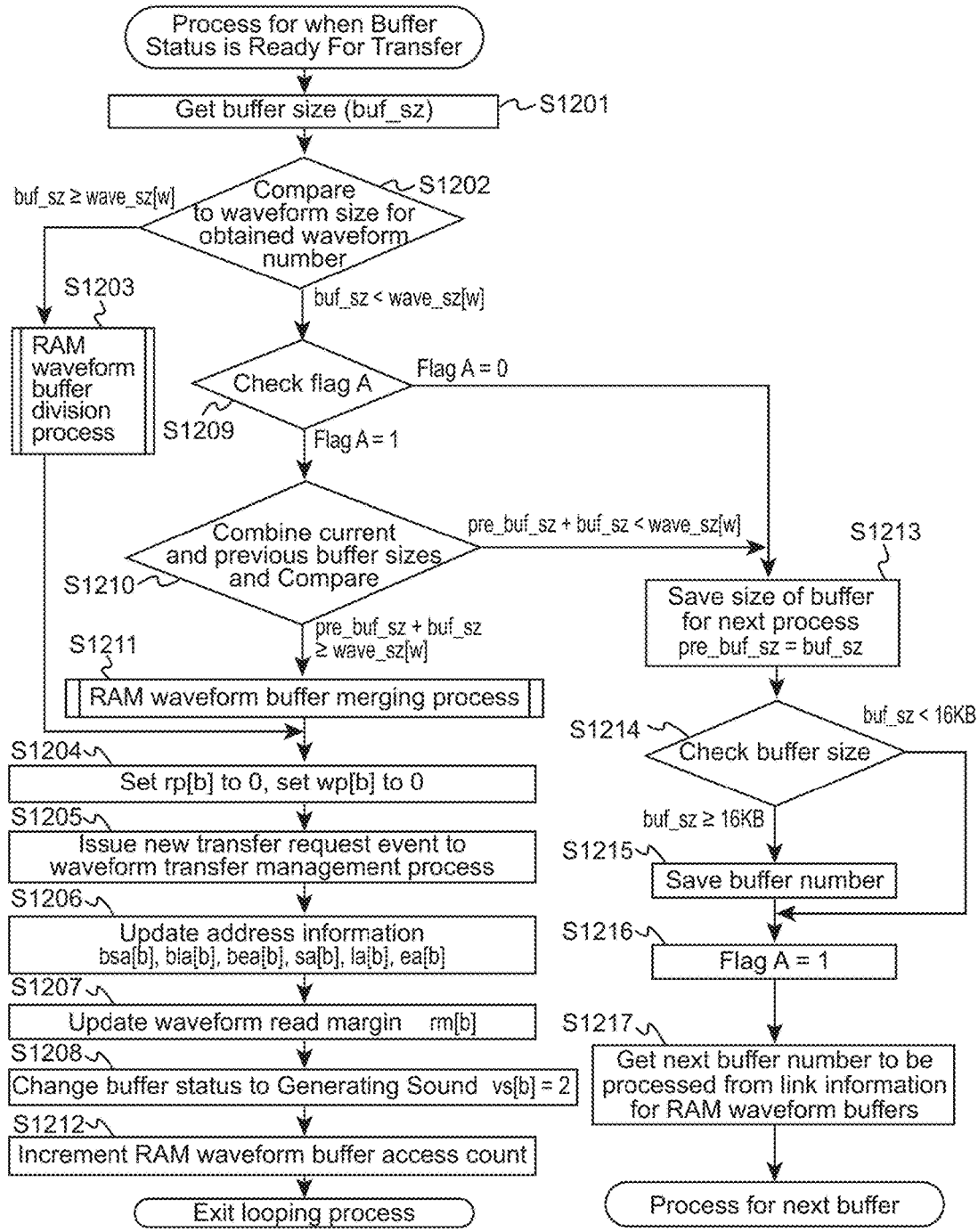
FIG. 12 is a flowchart illustrating a detailed example of a process for when buffer status is Ready For Transfer.

FIG. 12 is a flowchart illustrating a detailed example of the process for when buffer status is Ready For Transfer in step S1012 in FIG. 10.

First, the CPU 205 gets the size buf_sz of the waveform buffer for the current buffer number b (step S1201). Here, buf_sz can be calculated as the difference between the waveform buffer start address and the waveform buffer end address corresponding to the buffer number b in the RAM waveform buffer directory.

Next, the CPU 205 compares buf_sz to the size (wave_sz [w]) of the waveform data for the waveform number w obtained from the keypress information (step S1202). Here, wave_sz[w] can be calculated as the waveform size corresponding to this waveform number w in the flash memory tone color waveform directory in FIG. 5.

Upon determining in step S1202 that the waveform buffer size buf_sz is greater than or equal to the size wave_sz[w] of the waveform data corresponding to the keypress, the CPU 205 executes a RAM waveform buffer division process. The details of this process will be described later in reference to FIG. 13A.

Meanwhile, upon determining in step S1202 that the waveform buffer size buf_sz is less than the size wave_sz[w] of the waveform data corresponding to the keypress, the CPU 205 determines the value of the flag A (step S1209).

Upon determining in step S1209 that the value of the flag A is 1, the CPU 205 compares a combined waveform buffer size pre_buf_sz+buf_sz, which is a sum of the size buf_sz of the current waveform buffer and the size pre_buf_sz of the waveform buffer continuously stored immediately previous thereto in the working memory of the CPU 205 (see step S1213), to the size wave_sz[w] of the waveform data (step S1210).

Upon determining in step S1210 that pre_buf_sz+buf_sz is greater than or equal to wave_sz[w], the CPU 205 executes a RAM waveform buffer merging process. The details of this process will be described later in reference to FIG. 13B.

After the RAM waveform buffer division process in step S1203 or the RAM waveform buffer merging process in step S1211, the CPU 205 sets the write pointer wp[b] and the read pointer rp[b] corresponding to the buffer of the buffer number b to 0 (step S1204).

Next, the CPU 205 issues a new transfer request event for use in a waveform transfer management process which will be described later (step S1205).

Then, the CPU 205 updates the following address information (see FIG. 6) for the buffer specified by the current buffer number b: the waveform buffer start address bsa[b], the waveform buffer loop address bla[b], the waveform buffer end address bea[b], the start address sa[b], the loop address la[b], and the end address ea[b] (step S1206).

Next, the CPU 205 updates the waveform read margin (see FIG. 6) for the waveform buffer specified by the current buffer number b (step S1207).

Then, the CPU 205 changes the buffer status (see FIG. 6) for the current buffer number b to Generating Sound (step S1208).

Next, the CPU 205 increments the access count for waveform buffers in the RAM 204 (step S1212). Finally, the CPU 205 ends the process for when buffer status is Ready For Transfer of step S1012 in FIG. 10, which is illustrated in the flowchart in FIG. 12, and also exits the looping process of steps S1008 to S1014 in FIG. 10.

Meanwhile, upon determining in step S1209 that the value of the flag A is 0 or upon determining in step S1210 that pre_buf_sz+buf_sz is less than wave_sz[w], the CPU 205 executes the following sequence of processes from step S1213 to S1217.

In this sequence of processes, the CPU 205 first saves the size buf_sz of the current waveform buffer to the working memory or the like within the CPU 205 as pre_buf_sz so that that size can be used in the next iteration of the looping process (step S1213).

Next, the CPU 205 checks the current waveform buffer size buf_sz (step S1214).

Upon determining in step S1214 that buf_sz is greater than or equal to 16 KB, the CPU 205 saves the buffer number b to the working memory or the like within the CPU 205 (step S1215). Meanwhile, upon determining in step S1214 that buf_sz is less than 16 KB, the CPU 205 skips the process in step S1215.

Next, the CPU 205 sets the value of the flag A to 1 (step S1216).

Then, the CPU 205 gets the next buffer number to be processed from the link information for the RAM waveform buffers (step S1217). Next, the CPU 205 ends the process for when buffer status is Ready For Transfer of step S1012 in FIG. 10, which is illustrated in the flowchart in FIG. 12, and continues the repeating process of steps S1008 to S1014 in FIG. 10.

FIG. 13A is a flowchart illustrating a detailed example of the RAM waveform buffer division process of step S1203 in FIG. 12.

First, the CPU 205 compares the buffer size buf_sz to the size (wave_sz[w]) of the waveform data for the waveform number w obtained from the keypress information (step S1301).

Upon determining in step S1301 that the waveform buffer size buf_sz is less than or equal to the size wave_sz[w] of the waveform data corresponding to the keypress, the CPU 205 immediately ends the RAM waveform buffer division process of step S1203 in FIG. 12, which is illustrated in the flowchart in FIG. 13.

Meanwhile, upon determining in step S1301 that the waveform buffer size buf_sz is greater than the size wave_sz[w] of the waveform data corresponding to the keypress, the CPU 205 uses only an amount of the waveform buffer equal in size to the waveform data and makes the remaining space ready for transfer, thereby executing a waveform buffer division. First, the CPU 205 sets the size of the waveform buffer for the current buffer number to the same size as the waveform data (step S1302).

Next, the CPU 205 gets the buffer number of a buffer having a buffer status of NULL from the link information for the RAM waveform buffers. The CPU 205 then sets the size of this buffer to the remaining size obtained by subtracting the size wave_sz[w] of the waveform data from the current buffer size buf_sz and also sets the buffer status of this buffer to Ready For Transfer (S1303).

Finally, the CPU 205 updates the link information for the RAM waveform buffers such that this buffer which was just set to a buffer status of Ready For Transfer comes immediately after the current buffer (step S1304). The CPU 201 then ends the RAM waveform buffer division process of step S1203 in FIG. 12, which is illustrated in the flowchart in FIG. 13A.

FIG. 13B is a flowchart illustrating a detailed example of the RAM waveform buffer merging process of step S1211 in FIG. 12.

First, the CPU 205 changes the buffer status for the immediately prior buffer number to NULL (step S1310).

Next, the CPU 205 updates the link information for the RAM waveform buffers such that between the immediately prior buffer number and the current buffer number, the immediately prior buffer number comes last (step S1311). Finally, the CPU 205 ends the RAM waveform buffer merging process of step S1211 in FIG. 12, which is illustrated in the flowchart in FIG. 13B.

FIG. 13C is a flowchart illustrating a detailed example of the process for when buffer status is Generating Sound of step S1013 in FIG. 10.

First, the CPU 205 sets the flag A to 0 (step S1320).

Next, the CPU 205 gets the next buffer number to be processed from the link information for the RAM waveform buffers (step S1321). Finally, the CPU 205 ends the process for when buffer status is Generating Sound of step S1013 in FIG. 10, which is illustrated in the flowchart in FIG. 13C, and continues the repeating process of steps S1008 to S1014 in FIG. 10.

Figure 14:
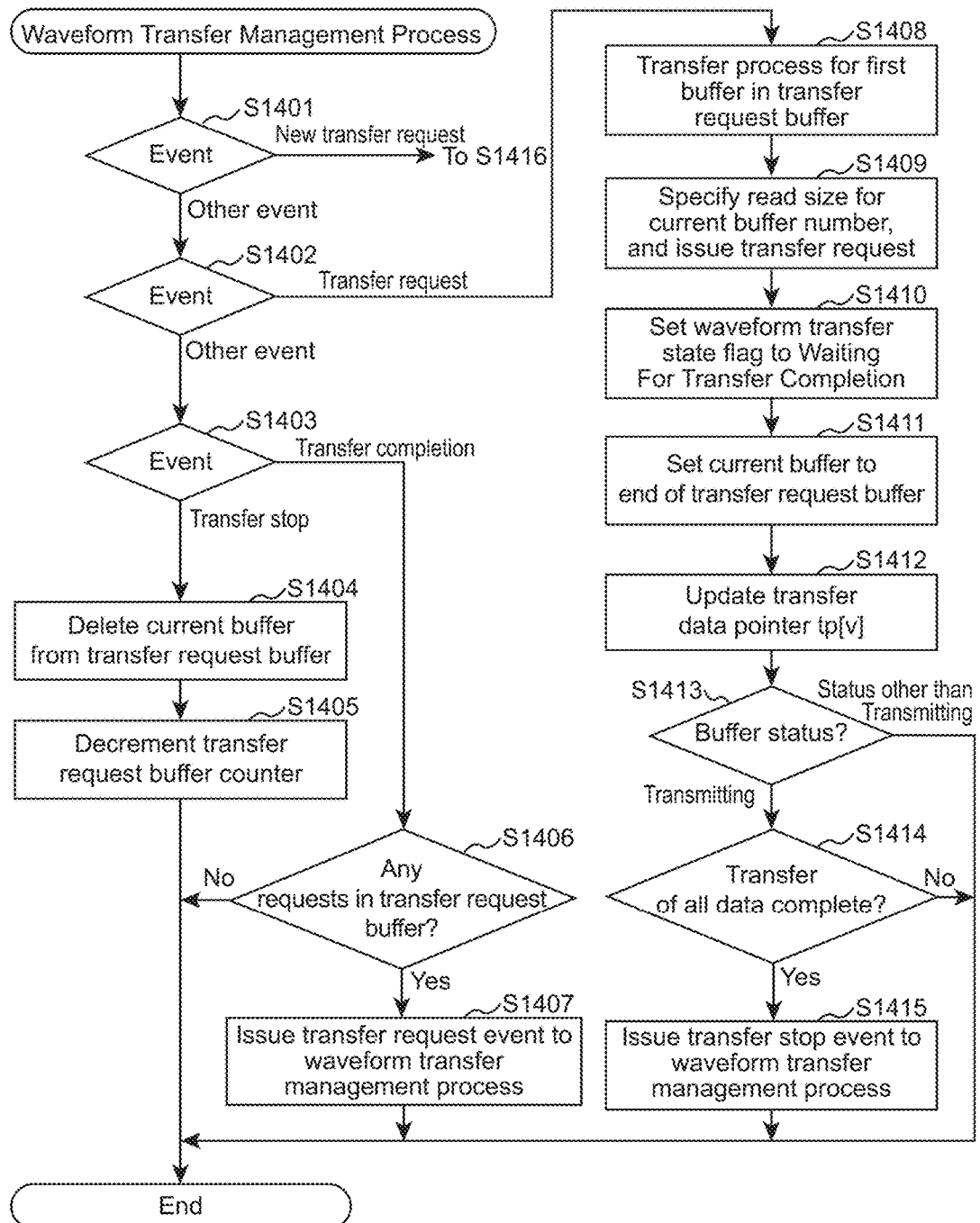
FIG. 14 is a (first) flowchart illustrating an example of a waveform transfer management process.
Figure 15:
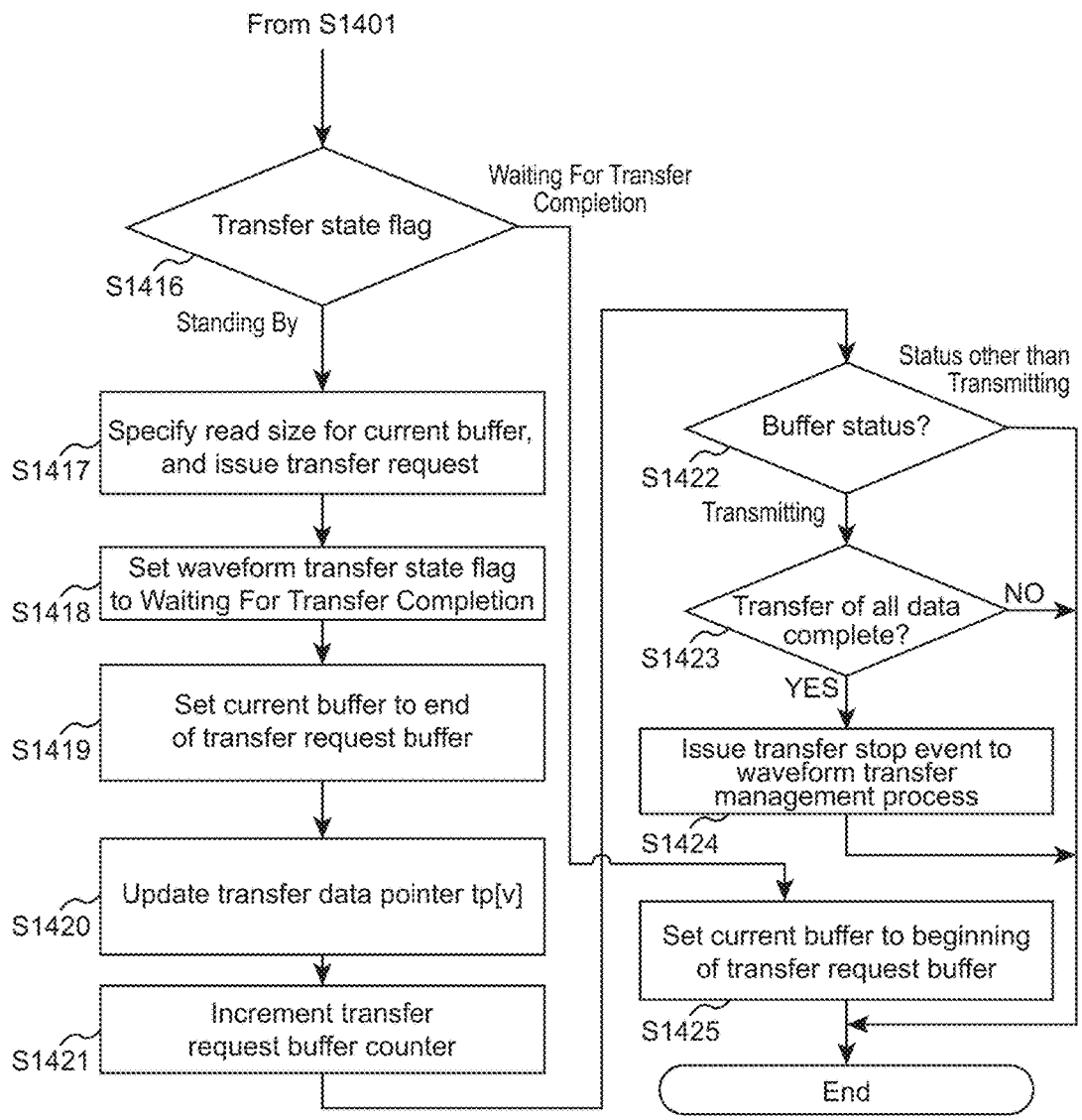
FIG. 15 is a (second) flowchart illustrating the example of the waveform transfer management process.

FIGS. 14 and 15 are flowcharts illustrating the waveform transfer management process. In steps S1401, S1402, and S1403 in FIG. 14, the CPU 205 respectively determines whether an event issued to the waveform transfer management process is a new transfer request, a transfer request, a transfer completion, or a transfer stop event and then executes processes corresponding to the respective events.

When a new transfer request event is issued (see step S1205 in FIG. 12), the determination in step S1401 in FIG. 14 yields YES, and the process of step S1416 in FIG. 15 is executed. In step S1416, the CPU 205 checks the transfer state flag.

If it is determined in step S1416 that the transfer state flag is Waiting For Transfer Completion, this means that a waveform transfer from the tone color waveform region to a waveform buffer is currently being performed for another buffer, and therefore the CPU 205 sets the current buffer to be at the beginning of the transfer request buffer so that the transfer request event is processed immediately after the transfer completion event for that other buffer (step S1425 in FIG. 15). Then, the CPU 205 ends the waveform transfer management process illustrated in the flowcharts in FIGS. 14 and 15.

Meanwhile, upon determining in step S1416 that the transfer state flag is Standing By, the CPU 205 first specifies a read size per transfer (here, 2 pages) for the current buffer number and then issues a transfer request for use in a waveform read/waveform buffer transfer process which will be described later with reference to FIG. 16 (step S1417 in FIG. 15).

Next, the CPU 205 sets the transfer state flag to Waiting For Transfer Completion (step S1418 in FIG. 15) and sets the current buffer to be at the end of the transfer request buffer (step S1419 in FIG. 15).

Then, the CPU 205 updates a transfer data pointer tp[v] (step S1420 in FIG. 15) and increments a transfer request buffer counter (step S1421 in FIG. 15).

Next, the CPU 205 checks a buffer status (step S1422 in FIG. 15). If the buffer status is determined to be Transmitting (i.e., the buffer status vs[b] is 2, 3, 4, or 5), this means that all of the waveforms are ready for transfer to the waveform buffer, so the CPU 205 proceeds to determine whether transfer of all of the data has been completed (step S1423 in FIG. 15). This determination can be made on the basis of whether the transfer data pointer has reached the end address.

If transfer of all of the data has been completed, no further transfers are necessary, so the CPU 205 issues a transfer stop event to the waveform transfer management process (step S1424 in FIG. 15). Then, the CPU 205 ends the waveform transfer management process illustrated in the flowcharts in FIGS. 14 and 15.

Meanwhile, upon determining in step S1422 that the buffer status is anything other than Transmitting (i.e., the buffer status vs[b] is 0 or 1) or upon determining in step S1423 that transfer of all of the data is not yet complete, the CPU 205 ends the waveform transfer management process illustrated in the flowcharts in FIGS. 14 and 15.

When transfer of a specified amount of waveform data is completed in the waveform read/waveform buffer transfer process described below and a transfer completion request event is issued to the waveform transfer management process (step S1607 in FIG. 16), the determinations in steps S1401 and S1402 in FIG. 14 yield NO (Other event) and the determination in step S1403 yields YES (Transfer completion), so the process of step S1406 in FIG. 14 is executed. In step S1406, the CPU 205 determines whether there are any buffers waiting for transfer in the transfer request buffer (that is, whether or not the transfer request buffer counter is 0).

If the determination in step S1406 yields NO, this means that all of the transfers from the tone color waveform region to the waveform buffers have been completed, so the CPU 205 does not do anything further and immediately ends the current waveform transfer management process illustrated in the flowcharts in FIGS. 14 and 15.

If the determination in step S1406 yields YES, the CPU 205 issues a transfer request event to the waveform transfer management process so that the next buffer is processed (step S1407) and then ends the current waveform transfer management process illustrated in the flowcharts in FIGS. 14 and 15.

Once a transfer request event is issued to the waveform transfer management process by the process of step S1407 in FIG. 14 as described above, the determination in step S1401 in FIG. 14 yields NO (Other event) and the determination in step S1402 yields YES (Transfer request), so the process of step S1408 in FIG. 14 is executed. In step S1408, the CPU 205 executes a transfer process for the first buffer in the transfer request buffer. Here, the write pointer wp[v] and the read pointer rp[v] are checked, and if performing a transfer to the waveform buffer v would result in the write pointer wp[v] passing the read pointer rp[v], that buffer v is set to the end of the transfer request buffer, and the process is performed on the second buffer from the start.

Next, the CPU 205 specifies a read size per transfer (here, 2 pages) for the current buffer number and then issues a transfer request for use in the waveform read/waveform buffer transfer process which will be described later with reference to FIG. 16 (step S1409 in FIG. 14).

Then, the CPU 205 sets the transfer state flag to Waiting For Transfer Completion (step S1410 in FIG. 14) and sets the current buffer to the end of the transfer request buffer (step S1411 in FIG. 14).

Next, the CPU 205 updates the transfer data pointer tp[v] (step S1412 in FIG. 14).

Then, the CPU 205 checks the buffer status (step S1413 in FIG. 14). Upon determining the buffer status to be Transmitting, the CPU 205 determines whether transfer of all of the waveform data to the waveform buffer has been completed (step S1414 in FIG. 14). This determination can be made on the basis of whether the transfer data pointer has reached the end address.

If transfer of all of the data has been completed, no further transfers are necessary, so the CPU 205 issues a transfer stop event to the waveform transfer management process (step S1415 in FIG. 14). Then, the CPU 205 ends the waveform transfer management process illustrated in the flowcharts in FIGS. 14 and 15.

Meanwhile, upon determining in step S1413 that the buffer status is anything other than Transmitting or upon determining in step S1414 that transfer of all of the data is not yet complete, the CPU 205 ends the waveform transfer management process illustrated in the flowcharts in FIGS. 14 and 15.

When a transfer stop event is issued to the waveform transfer management process in step S1424 in FIG. 15, step S1415 in FIG. 14, or in the sound source event process described later (step S1708 in FIG. 17), the determinations in steps S1401, S1402, and S1403 in FIG. 14 all yield NO (Other event or Transfer stop), so step S1404 is executed. In this case, the CPU 205 deletes the current buffer from the transfer request buffer (step S1404) and then decrements the transfer request buffer count (step S1405). Then, the CPU 205 ends the waveform transfer management process illustrated in the flowcharts in FIGS. 14 and 15.

Figure 16:
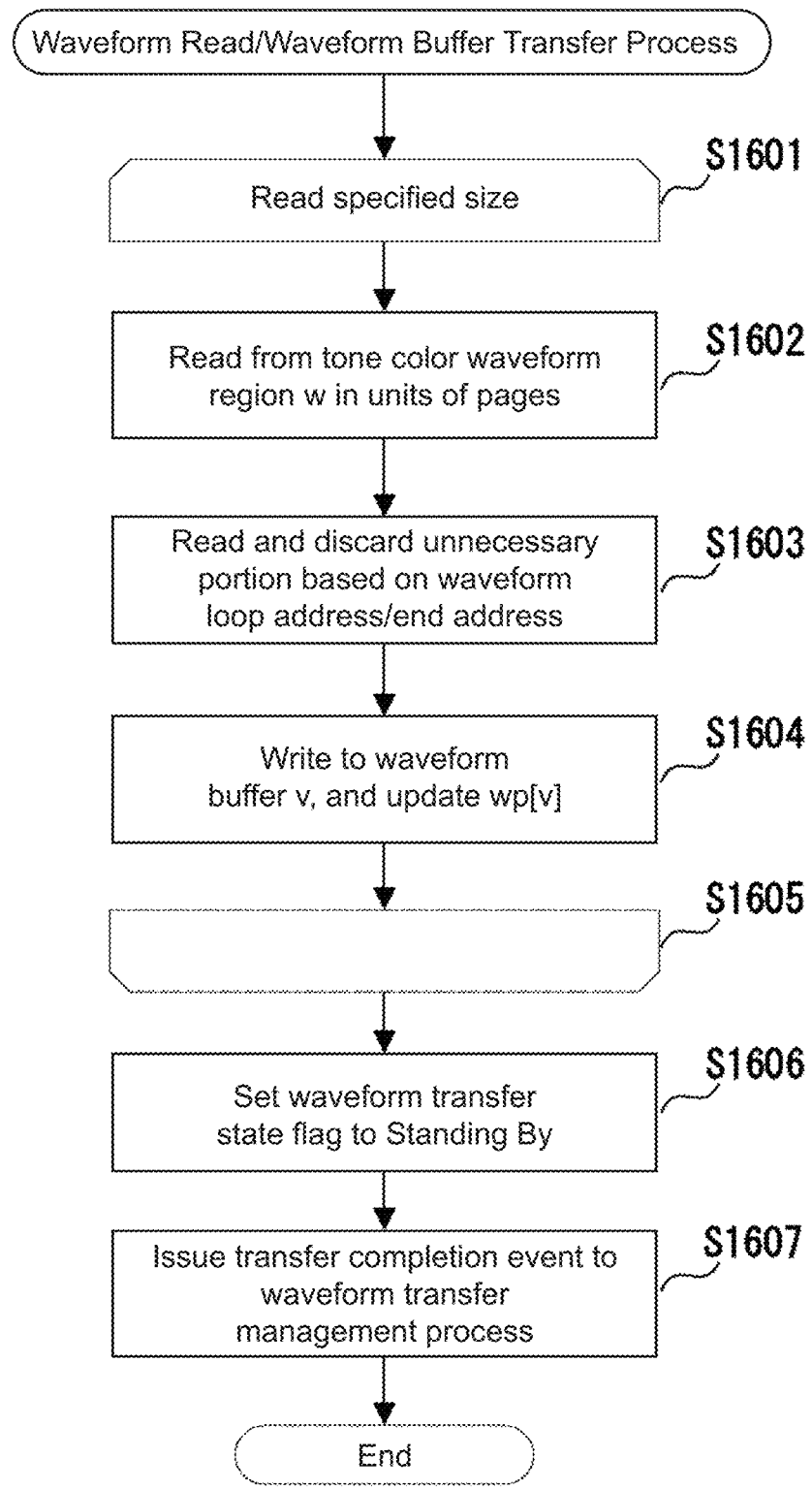
FIG. 16 is a flowchart illustrating an example of a waveform read/waveform buffer transfer process.

FIG. 16 is a flowchart illustrating the waveform read/waveform buffer transfer process. The process in this flowchart is triggered by a transfer request event issued in step S1417 in FIG. 15 or step S1409 in FIG. 14.

Steps S1601 and S1605 respectively represent the beginning and the end of a looped process. Using looping control processes in steps S1601 and S1605, the CPU 205 repeatedly executes the following sequence of processes from step S1602 to S1604 a number of times corresponding to the specified size specified in the waveform transfer management process (step S1417 in FIG. 15 or step S1409 in FIG. 14).

First, in step S1602, the CPU 205 reads waveform data in units of pages from a tone color waveform region w of the high-capacity flash memory 208 on the basis of the transfer data pointer tp[v].

Next, in step S1603, the CPU 205 considers the waveform buffer loop address and the waveform buffer end address, and, if performing a looped read, reads and discards the unnecessary portion.

Then, in step S1604, the CPU 205 writes the waveform data read from the tone color waveform region w in steps S1602 and S1603 to an address corresponding to the write pointer wp[v] for the waveform buffer v. The CPU 205 also updates the write pointer wp[v] by an amount equal to the size of the data written.

Once the repeating process of steps S1601 to S1605 is complete, the CPU 205 sets the transfer state flag to Standing By (step S1606) and issues a transfer completion event to the waveform transfer management process described above (step S1607). Finally, the CPU 205 ends the waveform read/waveform buffer transfer process illustrated in the flowchart in FIG. 16.

Figure 17:
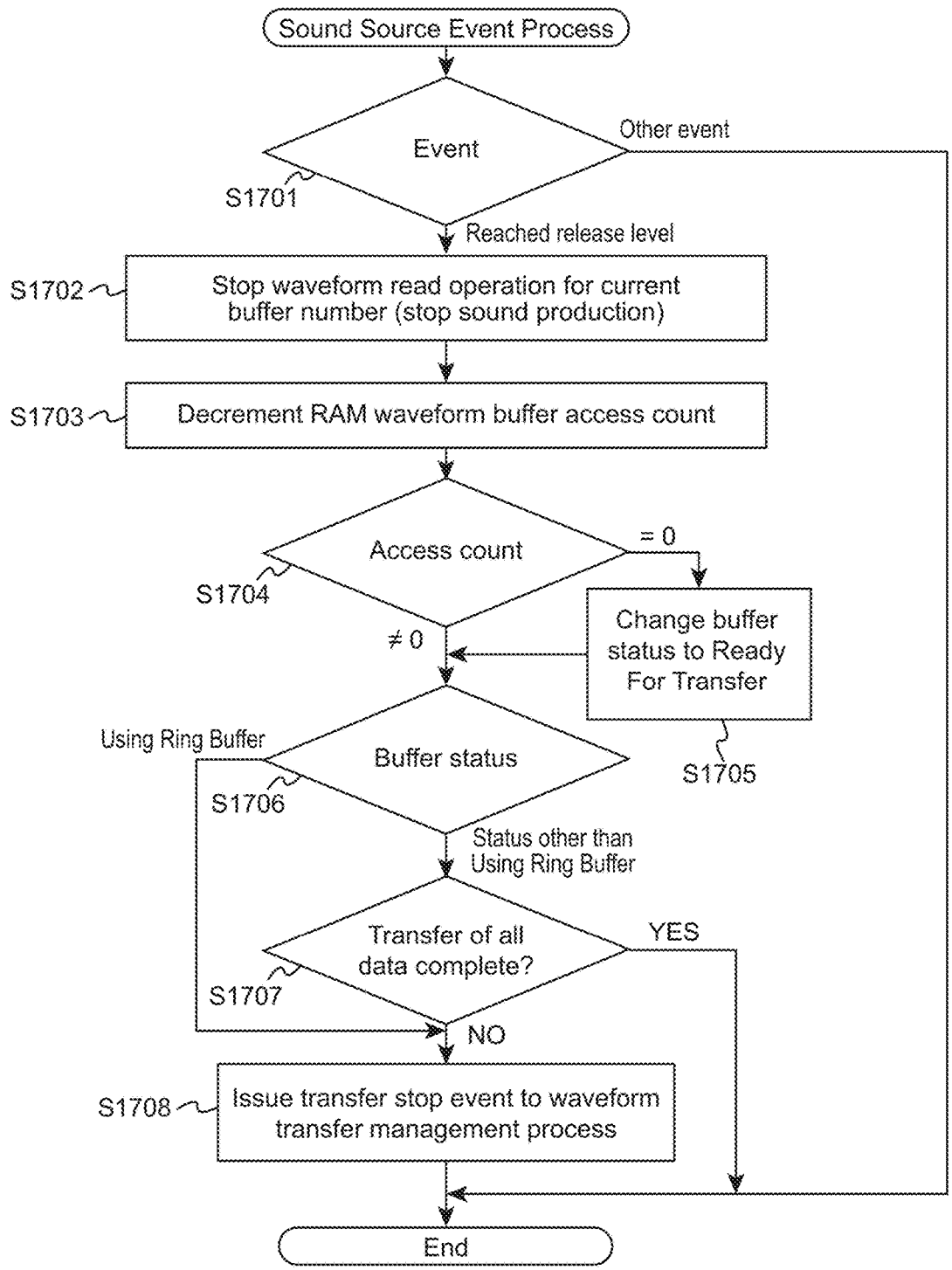
FIG. 17 is a flowchart illustrating an example of a sound source event process.

FIG. 17 is a flowchart illustrating a detailed example of the sound source event process of step S810 in FIG. 8. The CPU 205 first determines whether a buffer that has been transitioned to a released state by the key release process of step S809 in FIG. 8 has reached a release level (step S1701).

Upon determining in step S1701 that the release level has not been reached, the CPU 205 immediately ends the sound source event process of step S810 in FIG. 8, which is illustrated in the flowchart in FIG. 17.

Meanwhile, upon determining in step S1701 that the release level has been reached, the CPU 205 sends an instruction to stop the waveform read operation (stop sound production) to the waveform readers 305 (FIG. 3) in the sound source LSI 206 which correspond to that determination (step S1702).

Next, the CPU 205 decrements the RAM waveform buffer access count (step S1703).

The CPU 205 then determines the value of the access count after the decrementing process in step S1703 (step S1704).

Upon determining in step S1704 that the value of the access count is 0, the CPU 205 sets the buffer status of the corresponding waveform buffer to Ready For Transfer (step S1705).

Meanwhile, upon determining in step S1704 that the value of the access count is not 0, the CPU 205 skips the process of step S1705.

Next, the CPU 205 checks the buffer status (step S1706).

Upon determining in step S1706 that the buffer status is not Using Ring Buffer, the CPU 205 further determines whether transfer of all of the data has been completed (step S1707).

Upon determining in step S1706 that the buffer status is Using Ring Buffer or upon determining in step S1707 that transfer of all of the data is not yet complete, the CPU 205 issues a transfer stop event to the waveform transfer management process described above (step S1708). Then, the CPU 205 ends the sound source event process of step S810 in FIG. 8, which is illustrated in the flowchart in FIG. 17.

Meanwhile, upon determining in step S1707 that transfer of all of the data has been completed, the CPU 205 immediately ends the sound source event process of step S810 in FIG. 8, which is illustrated in the flowchart in FIG. 17.

As described above, one embodiment of the present invention is a sequential transfer-type musical sound generation device including the high-speed, low-capacity RAM 204 storing waveform data to be read by the sound source LSI 206 as well as the lower-speed, high-capacity flash memory 208 such as NAND flash memory storing the waveform data for all of the tone colors available on the device. When a musical performance begins, data begins to be transferred from the tone color waveform region of the high-capacity flash memory 208 to waveform buffers in the RAM 204, and once a prescribed amount of data has been transferred, the sound source begins reading that data. Here, rather than equally dividing the regions for the waveform buffers and assigning a fixed size thereto, a single continuous region is dynamically divided so that when producing sound, all of the data for a single waveform can be transferred to a buffer using a single read operation. Thus, transfers of looped segments of waveforms can be completed in a single transfer operation, thereby making it possible to reduce the total waveform transfer load. Moreover, in the present embodiment, if the waveform needed to produce a new sound already remains in a waveform buffer, that waveform can be reused as a cached waveform. Furthermore, in the present embodiment, if a waveform buffer large enough to read the waveform data cannot be allocated, a leftover region is used as a ring buffer to make it possible to perform a looped read similar to in conventional technologies. By virtue of these control processes, the present embodiment makes it possible to provide a musical sound generation device which can improve the number of sounds that can be produced simultaneously or to provide an electronic musical instrument utilizing such a musical sound generation device. In addition, the present embodiment makes it possible to provide a musical sound generation device which can reduce the cost of hardware capable of improving degradations in performance or to provide an electronic musical instrument utilizing such a musical sound generation device.

In addition to the operation of the embodiment as described above, control operations such as the following may be implemented. In the embodiment described above, instead of abandoning sound production when not even a region (second region) capable of serving as a ring buffer can be allocated, the following processes can be executed. More specifically, a transfer region allocation process of allocating a region already storing other waveform data among a plurality of regions in the waveform buffer (second memory) as a ready-for-transfer region which is ready for transfer of waveform data as well as a third transfer process of transferring waveform data to the ready-for-transfer region allocated by the transfer region allocation process are executed. This makes it possible to silence waveform data for which sound production is substantially complete or waveform data for which the volume of the associated emitted sound has become small and to then begin sound production for new waveform data, thereby making it possible to minimize the possibility of having to abandon sound production.

Although specific embodiments of the present invention were described above, the present invention is not limited to the embodiments described above, and various modifications can be made without departing from the spirit of the invention. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A musical sound generation device, comprising:
    a performance operation element for receiving a user operation for musical performance;
    a first memory storing a plurality of pieces of waveform data;
    a second memory having an access speed faster than the first memory for temporarily storing data transferred from the first memory;
    a processor that transfers data stored in the first memory to the second memory; and
    a sound source circuit including a waveform reader that can read data only from the second memory for generating digital musical sounds,
    wherein in response to an operation of the performance operation element designating a specific piece of waveform data, the processor determines whether the designated specific piece of waveform data is already in the second memory, and if not, attempts to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element,
    wherein in attempting to allocate the non-ring buffer region or the ring buffer region, the processor first determines whether the non-ring buffer region sufficient to receive the designated specific piece of waveform data can be allocated in the second memory, and if so, transfers the designated specific piece of waveform data from the first memory to the non-ring buffer region of the second memory, and
    wherein, if the non-ring buffer region sufficient to receive the designated specific piece of waveform data cannot be allocated in the second memory, the processor attempts to allocate the ring buffer region in the second memory, and if allocated, transfers the designated specific piece of waveform data from the first memory to the ring buffer region of the second memory in the ring-buffer manner so as to be accessible by the waveform reader as the ring buffer.

2. The musical sound generation device according to claim 1, wherein the processor allocates the non-ring buffer region so that a size of the non-ring buffer region matches a size of the designated specific piece of waveform data, thereby dynamically allocating the non-ring buffer region.

3. The musical sound generation device according to claim 2, wherein in dynamically allocating the non-ring buffer region, the processor divides an existing buffer region or merge two or more of existing buffer regions in the second memory depending on the size of the designated specific piece of waveform data and sizes of the existing buffer regions in the second memory.

4. The musical sound generation device according to claim 2, wherein when the processor cannot allocate the ring buffer region in the second memory, the processor assigns a region already storing other pieces of waveform data in the second memory as a ready-for-transfer region that is ready for transfer of waveform data, and transfers the designated specific piece of waveform data to the ready-for-transfer region so allocated.

5. A method executed by a processor in a musical sound generation device that includes, in addition to the processor: a performance operation element for receiving a user operation for musical performance; a first memory storing a plurality of pieces of waveform data; a second memory having an access speed faster than the first memory for temporarily storing data transferred from the first memory; a sound source circuit including a waveform reader that can read data only from the second memory for generating digital musical sounds, the method comprising:

in response to an operation of the performance operation element designating a specific pieces of waveform data, determining whether the designated specific piece of waveform data is already in the second memory, and if not, attempting to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element;

in attempting to allocate the non-ring buffer region or the ring buffer region, first determining whether the non-ring buffer region sufficient to receive the designated specific piece of waveform data can be allocated in the second memory, and if so, transferring the designated specific piece of waveform data from the first memory to the non-ring buffer region of the second memory; and if the non-ring buffer region sufficient to receive the designated specific piece of waveform data cannot be allocated in the second memory, attempting to allocate the ring buffer region in the second memory, and if allocated, transferring the designated specific piece of waveform data from the first memory to the ring buffer region of the second memory in the ring-buffer manner so as to be accessible by the waveform reader as the ring buffer.

6. A computer-readable non-transitory storage medium having stored thereon a program to be executable by a processor in a musical sound generation device that includes, in addition to the processor: a performance operation element for receiving a user operation for musical performance; a first memory storing a plurality of pieces of waveform data; a second memory having an access speed faster than the first memory for temporarily storing data transferred from the first memory; a sound source circuit including a waveform reader that can read data only from the second memory for generating digital musical sounds, the program causing the processor to perform the following:

in response to an operation of the performance operation element designating a specific pieces of waveform data, determining whether the designated specific piece of waveform data is already in the second memory, and if not, attempting to allocate a non-ring buffer region or a ring buffer region in the second memory, the non-ring buffer region being to store an entirety of the designated specific piece of waveform data to be read by the waveform reader in response to the operation of the performance operation element, the ring buffer region being to store the designated specific piece of waveform data as a ring buffer so as to be updated by data from the first memory and read by the waveform reader in a ring-buffer manner in response to the operation of the performance operation element;

in attempting to allocate the non-ring buffer region or the ring buffer region, first determining whether the non-ring buffer region sufficient to receive the designated specific piece of waveform data can be allocated in the second memory, and if so, transferring the designated specific piece of waveform data from the first memory to the non-ring buffer region of the second memory; and if the non-ring buffer region sufficient to receive the designated specific piece of waveform data cannot be allocated in the second memory, attempting to allocate the ring buffer region in the second memory, and if allocated, transferring the designated specific piece of waveform data from the first memory to the ring buffer region of the second memory in the ring-buffer manner so as to be accessible by the waveform reader as the ring buffer.

\* \* \* \* \*